United States Patent
Masters

(10) Patent No.: US 10,888,887 B2
(45) Date of Patent: Jan. 12, 2021

(54) ELECTRIC PRESSURE WASHER WITH FOLDING HANDLE

(71) Applicant: Briggs & Stratton Corporation, Wauwatosa, WI (US)

(72) Inventor: Tyler D. Masters, Wauwatosa, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 230 days.

(21) Appl. No.: 15/811,637

(22) Filed: Nov. 13, 2017

(65) Prior Publication Data

US 2018/0133729 A1    May 17, 2018

Related U.S. Application Data

(60) Provisional application No. 62/421,830, filed on Nov. 14, 2016.

(51) Int. Cl.
*B05B 7/04* (2006.01)
*B05B 9/00* (2006.01)
(Continued)

(52) U.S. Cl.
CPC .......... *B05B 9/007* (2013.01); *A47L 11/4091* (2013.01); *B05B 7/0087* (2013.01);
(Continued)

(58) Field of Classification Search
CPC ......... B05B 9/007; B05B 9/01; B05B 7/0087; B05B 7/32; B05B 9/0413; B05B 9/0426;
(Continued)

(56) References Cited

U.S. PATENT DOCUMENTS 2,785,925 A * 3/1957 Bell .................. B05B 13/06
                                                    239/597
3,545,786 A * 12/1970 Yoder .................. B62B 5/06
                                                    280/47.24

(Continued)

FOREIGN PATENT DOCUMENTS

| JP | 2009-140718 A | 6/2009 |
| JP | 2011-028963 A | 2/2011 |
| JP | 2014-013663 A | 1/2014 |

OTHER PUBLICATIONS

Image of Power Washer, retrieved from http://archlwum.allegro.pl/oferta/myjka-cisnieniowa- lavor-prime165-2500w-I5-250ewbar-i5011274112.html (retrieved on Sep. 17, 2016).

*Primary Examiner* — Tuongminh N Pham
(74) *Attorney, Agent, or Firm* — Foley & Lardner LLP

(57) ABSTRACT

A pressure washer includes a motor configured to drive a pump, a frame having first and second end portions, a handle having first and second end portions, and a rotating joint rotatably coupling the first end portion of the handle to the second end portion of the frame. The rotating joint includes a locking mechanism to selectively lock the position of the handle relative to the frame. The handle rotates between a storage position and an extended position. In the storage position, the second end portion of the handle is positioned near the first end portion of the frame such that the motor and the pump are located within a volume defined by the first and second end portions of the handle and the frame. In the extended position, the second end portion of the handle is spaced apart from the frame.

20 Claims, 15 Drawing Sheets

(51) Int. Cl.
    *B05B 9/04* (2006.01)
    *A47L 11/40* (2006.01)
    *F16M 11/42* (2006.01)
    *F16M 11/38* (2006.01)
    *B05B 9/08* (2006.01)
    *B05B 7/00* (2006.01)
    *B05B 7/32* (2006.01)
    *B05B 9/01* (2006.01)

(52) U.S. Cl.
    CPC .............. *B05B 7/32* (2013.01); *B05B 9/01* (2013.01); *B05B 9/0413* (2013.01); *B05B 9/0426* (2013.01); *B05B 9/0861* (2013.01); *F16M 11/38* (2013.01); *F16M 11/42* (2013.01); *B08B 2203/027* (2013.01); *B08B 2203/0211* (2013.01); *B08B 2203/0217* (2013.01); *F16M 2200/025* (2013.01); *F16M 2200/08* (2013.01)

(58) Field of Classification Search
    CPC ...... B05B 9/0861; F16M 11/38; F16M 11/42; F16M 2200/025; F16M 2200/08; B08B 3/026; B08B 2203/0211; B08B 2203/0217; B08B 2203/27
    See application file for complete search history.

(56) References Cited

U.S. PATENT DOCUMENTS

| | | | |
|---|---|---|---|
| 5,405,086 A * | 4/1995 | Kranzle | B08B 3/026 239/172 |
| 5,494,414 A | 2/1996 | Steinhart et al. | |
| D375,590 S | 11/1996 | Steinhart et al. | |
| D467,692 S | 12/2002 | Morgan et al. | |
| D580,610 S | 11/2008 | Hawkins | |
| D590,110 S | 4/2009 | Hawkins | |
| D622,471 S | 8/2010 | Hernandez | |
| D633,263 S | 2/2011 | Fay | |
| D634,083 S | 3/2011 | Fay | |
| D639,001 S | 5/2011 | Alexander et al. | |
| D648,082 S | 11/2011 | Alexander et al. | |
| 8,337,172 B2 | 12/2012 | Klika et al. | |
| 8,398,097 B2 * | 3/2013 | Junk | B08B 3/026 123/195 R |
| 8,408,882 B2 | 4/2013 | Klika et al. | |
| D688,841 S | 8/2013 | Van Deursen | |
| 8,500,046 B2 | 8/2013 | Gilpatrick et al. | |
| 8,590,814 B2 | 11/2013 | Gilpatrick et al. | |
| D702,900 S | 4/2014 | Kahan et al. | |
| D703,888 S | 4/2014 | Kahan et al. | |
| 8,814,531 B2 | 8/2014 | Raasch | |
| D732,764 S | 6/2015 | Kennard et al. | |
| D733,373 S | 6/2015 | Kahan et al. | |
| D742,080 S | 10/2015 | Rigon | |
| D749,805 S | 2/2016 | Janik et al. | |
| 2007/0207043 A1 * | 9/2007 | Hahn | F04B 17/05 417/234 |
| 2009/0317262 A1 | 12/2009 | Gilpatrick | |
| 2010/0282862 A1 | 11/2010 | Gilpatrick | |
| 2011/0171045 A1 | 7/2011 | Gilpatrick et al. | |
| 2011/0315176 A1 | 12/2011 | Gilpatrick | |
| 2012/0018534 A1 | 1/2012 | Gilpatrick | |
| 2012/0111378 A1 | 5/2012 | Brow | |
| 2014/0246517 A1 | 9/2014 | Raasch | |
| 2015/0102121 A1 | 4/2015 | Dey et al. | |
| 2015/0108253 A1 | 4/2015 | Schmalz | |
| 2015/0306614 A1 | 10/2015 | Pierce | |
| 2016/0067726 A1 | 3/2016 | Gilpatrick et al. | |
| 2017/0304873 A1 * | 10/2017 | Luby | B08B 3/026 |
| 2018/0021800 A1 | 1/2018 | Janik | |
| 2018/0021819 A1 | 1/2018 | Schaller et al. | |
| 2019/0009309 A1 * | 1/2019 | Rickey | B05B 9/007 |

\* cited by examiner

ELECTRIC PRESSURE WASHER WITH FOLDING HANDLE

CROSS-REFERENCE TO RELATED PATENT APPLICATIONS

This application claims the benefit of U.S. Provisional Application No. 62/421,830, filed Nov. 14, 2016, which is incorporated herein by reference in its entirety.

BACKGROUND

The present application relates generally to the field of pressure washers and in particular to electric pressure washers.

Electric pressure washers typically include an electric motor configured to drive a pump to provide a pressurized flow of water to a nozzle. The nozzle creates a jet of water that is useful for cleaning and stripping layers of material from various surfaces (e.g., stones, concrete, wood, plastic, etc.). The nozzle is typically incorporated into a wand that is connected to the pump with a hose and that facilitates user control over the direction of the jet. The electric motor and pump are typically supported on the ground by a frame or housing. Most pressure washers include a handle fixed to the frame or housing to facilitate user control of the pressure washer while moving between locations.

Conventionally, pressure washers are oriented similarly (e.g., in an upright orientation) both while in use and while in storage. In some cases, the pressure washer is tall with a relatively narrow base. Such an arrangement can be unstable during use due to lateral forces exerted on the frame or housing by the hose. In other electric pressure washers, the frame is shorter with a relatively wide base. Such an arrangement can require a relatively large amount of storage space due to its wide footprint. Accordingly, there is a need for an electric pressure washer that is stable during use and that requires a minimal amount of space while in storage.

SUMMARY

One embodiment relates to a pressure washer including a water pump, an electric motor coupled to the water pump and configured to drive the water pump, a frame having a first end portion and a second end portion, a handle having a first end portion and a second end portion, and a rotating joint rotatably coupling the first end portion of the handle to the second end portion of the frame. The rotating joint includes a locking mechanism to selectively lock the position of the handle relative to the frame. The handle is configured to rotate between a storage position and an extended position. In the storage position, the second end portion of the handle is positioned near the first end portion of the frame such that the electric motor and the water pump are located within a volume defined by the first and second end portions of the handle and the frame. In the extended position, the second end portion of the handle is spaced apart from the frame.

Another embodiment relates to a pressure washer including a water pump, an electric motor coupled to the water pump and configured to drive the water pump, and a body supporting the water pump and the electric motor, the body having a first side and a second side. In a normal operating orientation, the first side is configured to be disposed proximate to a surface for supporting the pressure washer such that the pressure washer defines a first footprint having a first area. In a storage orientation, the second side is configured to be disposed proximate to the surface for supporting the pressure washer such that the pressure washer defines a second footprint having a second area less than the first area. When the surface for supporting the pressure washer is flat and level, the pressure washer is configured to stand stably on the surface for supporting the pressure washer in both the normal operating orientation and the storage orientation.

Still another embodiment relates to a pressure washer including a water pump, an electric motor coupled to the water pump and configured to drive the water pump, a body supporting the water pump and the electric motor, the body having a first side and a second side, a chemical injection device configured to selectively add chemicals to an output water flow, and a chemical storage tank. The chemical storage tank includes a tank body defining a storage volume for storing chemicals and a fill neck extending from the tank body. The storage volume is fluidly coupled to the chemical injection device, and the fill neck defines an inlet opening, an outlet opening, and a fill passage extending between the inlet opening and the outlet opening. The outlet opening fluidly couples the fill passage to the storage volume. In a normal operating orientation, the first side is configured to be disposed proximate to a surface for supporting the pressure washer, and the outlet opening is positioned below the inlet opening. In a storage orientation, the second side is configured to be disposed proximate to the surface for supporting the pressure washer, and the outlet opening is positioned below the inlet opening.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
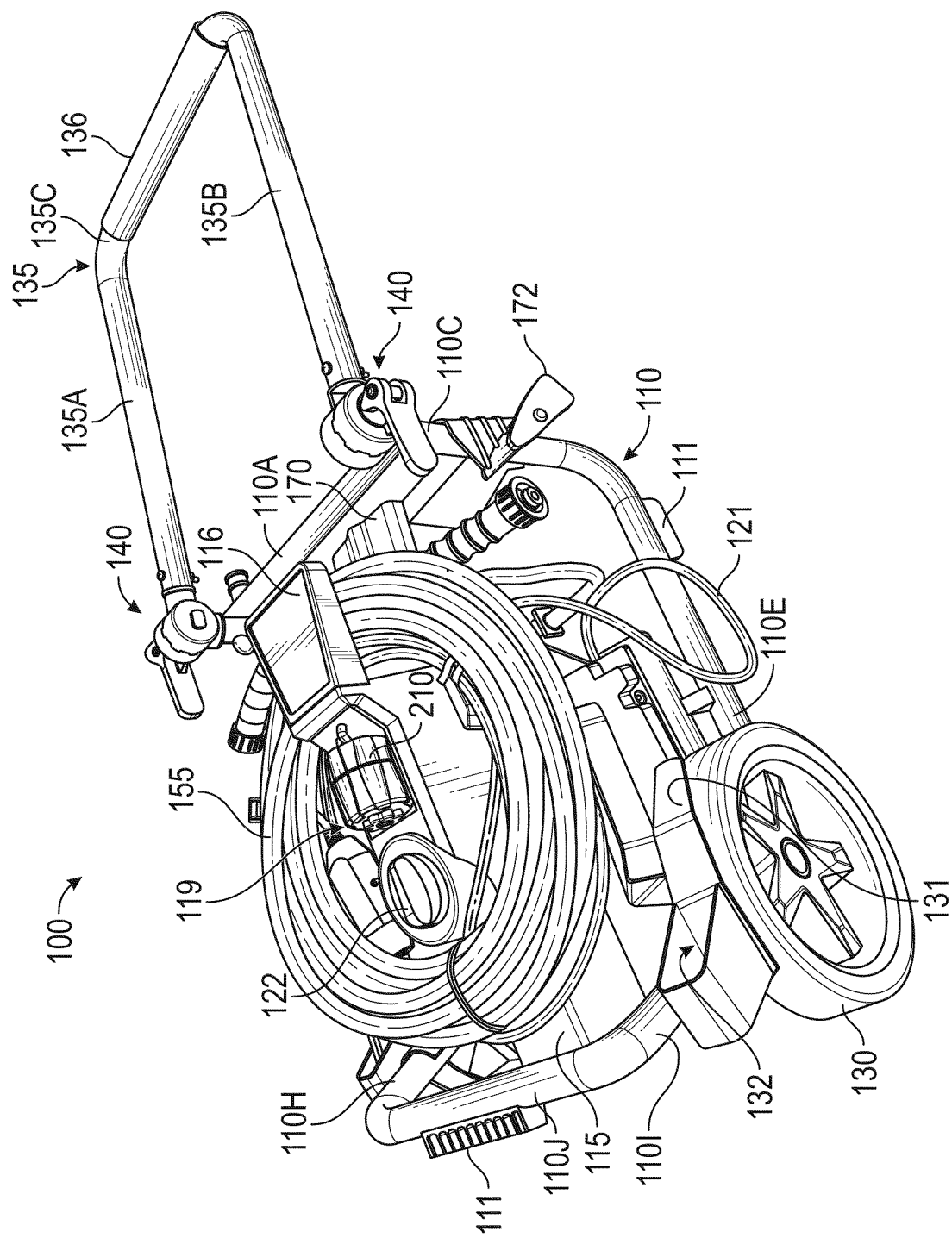
FIG. 1 is perspective view of a pressure washer, according to an exemplary embodiment.
Figure 2:
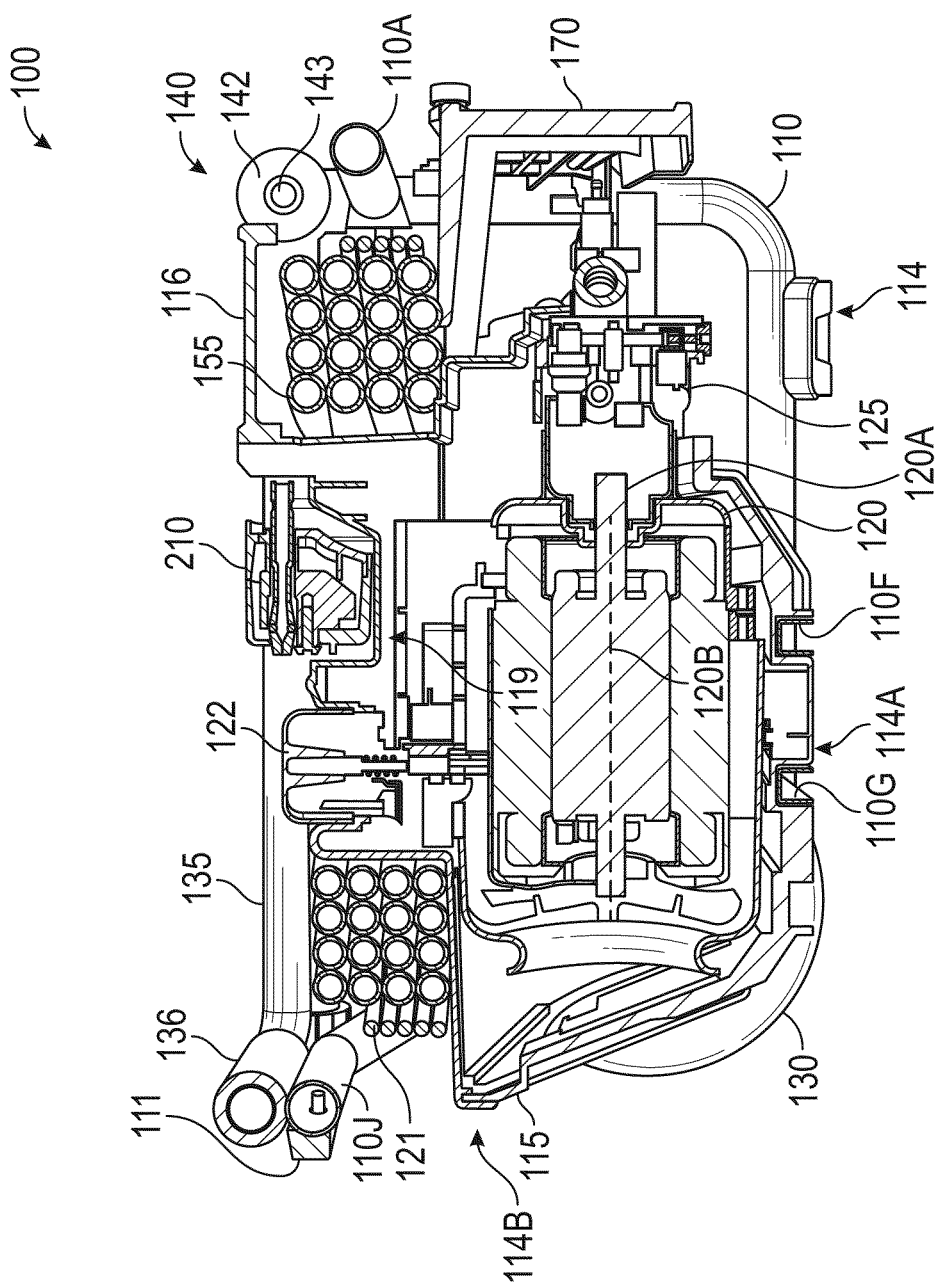
FIG. 2 is a section view of the pressure washer of FIG. 1.
Figure 3:
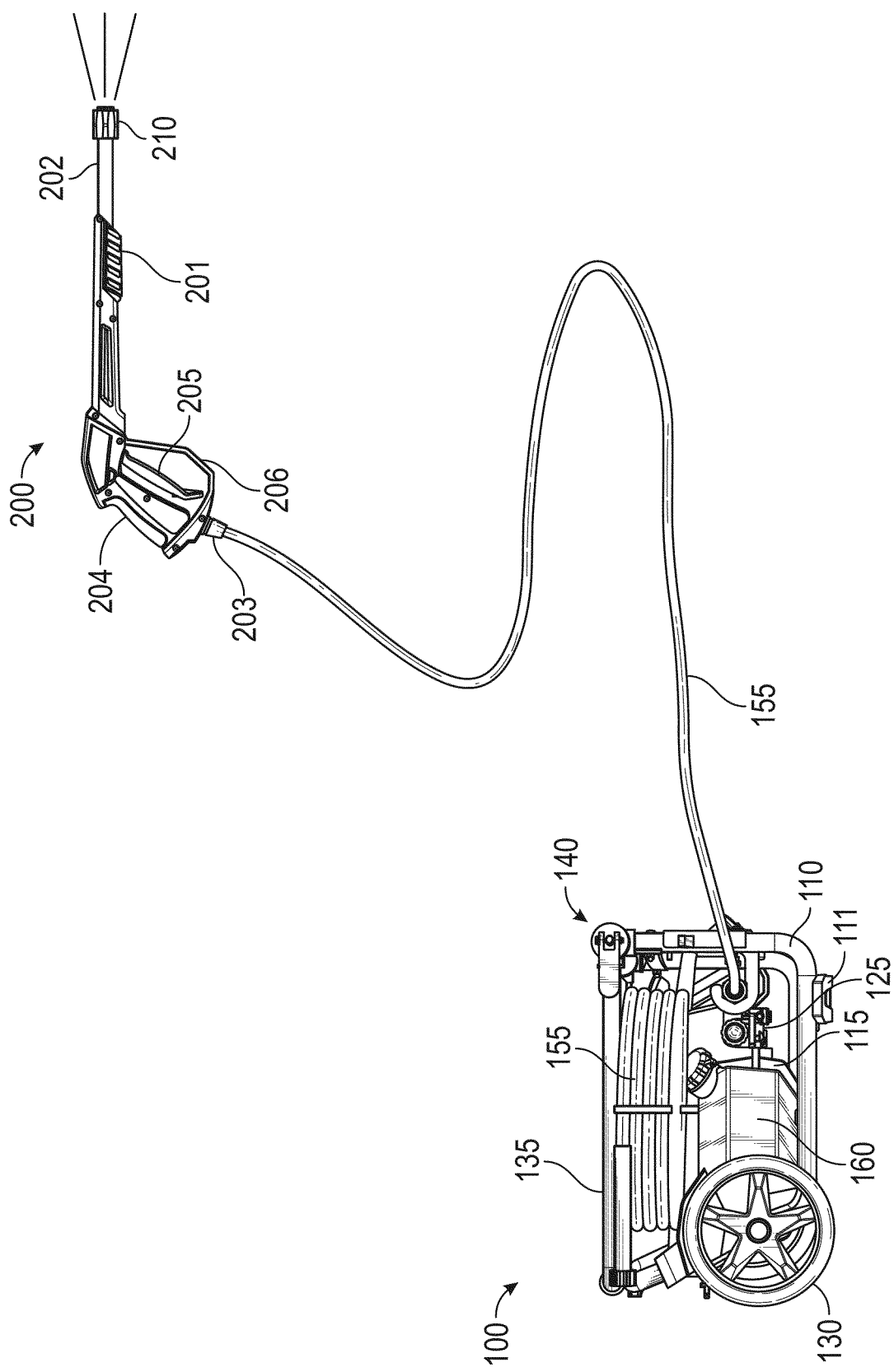
FIG. 3 is a side view of the pressure washer of FIG. 1 and a spray gun assembly.

Referring to FIGS. 1-3, a pressure washer 100 includes a frame 110 supporting a primary driver, shown as electric motor 120, and a water pump 125 (e.g., a positive displacement pump, piston water pump, axial cam pump) configured to be connected (e.g., fluidly coupled) to a spray gun assembly 200 through a high-pressure hose 155 or other type of delivery conduit. In some embodiments, the electric motor 120 and pump 125 are contained at least partially within (e.g., at least partially surrounded by) a housing 115. The housing 115 is fixedly coupled (e.g., bolted, clamped, welded, bonded using adhesive) to the frame 110. The electric motor 120 and the pump 125 are supported by the frame 110 and the housing 115. The electric motor 120 includes an output shaft, shown as motor shaft 120A, that rotates about an axis of rotation 120B. The water pump 125 is coupled (e.g., directly coupled, indirectly coupled by a transmission, belts, gears, or other drive system, etc.) to the motor shaft 120A of the electric motor 120, which provides rotational mechanical energy to drive the pump 125. In some embodiments, one or both of the electric motor 120 and pump 125 are coupled to the housing 115. In other embodiments, the housing 115 is omitted and one or both of the electric motor 120 and pump 125 are coupled directly to the frame 110. To facilitate manual portability, the pressure washer 100 includes wheels 130 and a locking and folding handle, shown as handle 135.

Figure 4:
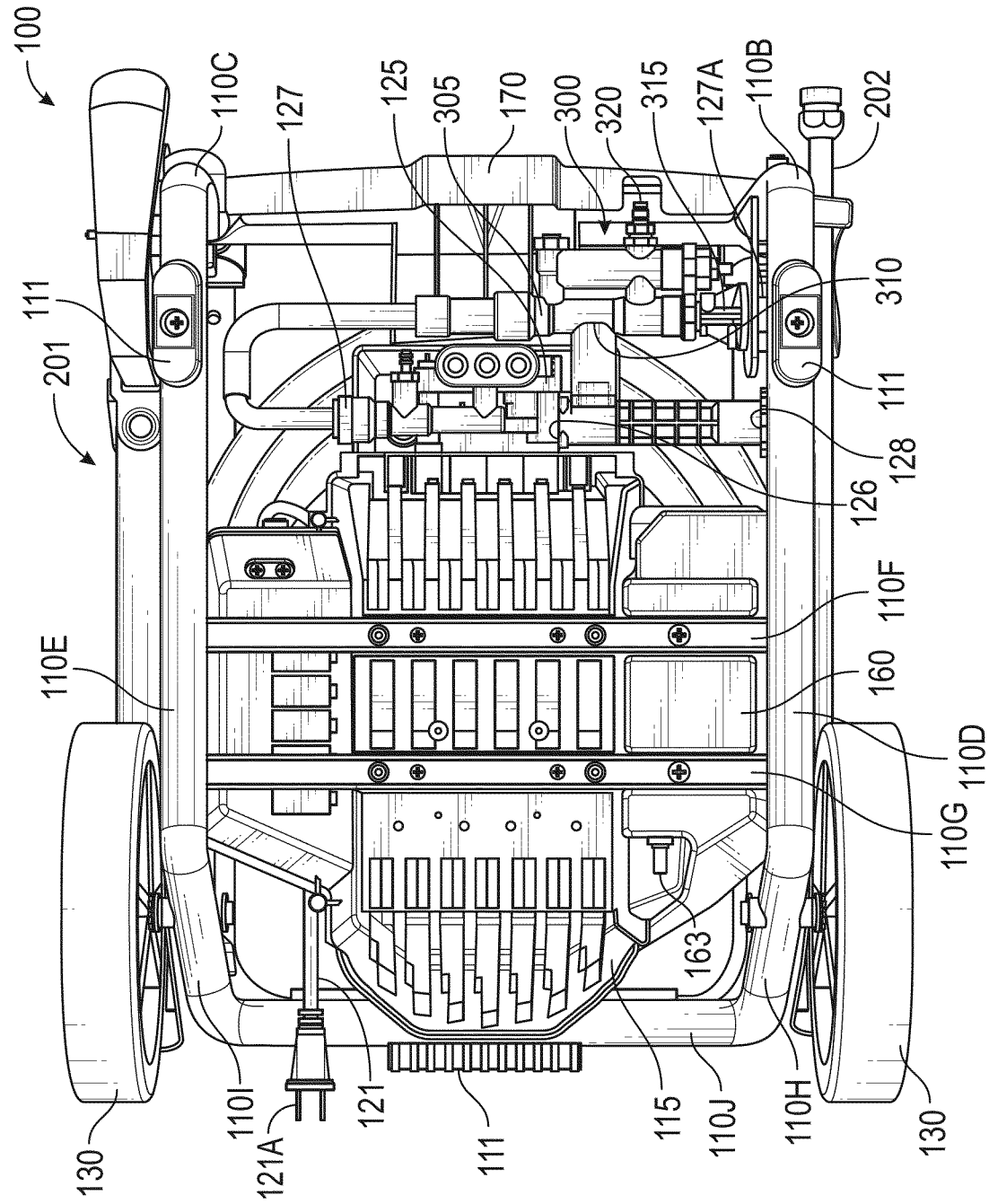
FIG. 4 is a bottom view of the pressure washer of FIG. 1.

As shown in FIG. 4, the water pump 125 includes a low-pressure inlet, shown as pump inlet 126, and a high-pressure outlet, shown as pump outlet 127. The pump inlet 126 is configured to be connected (e.g., fluidly coupled) to a supply conduit or hose, which is in turn connected to a low-pressure fluid supply (e.g., a spigot connected to a municipal water supply or well). In some embodiments, the pump inlet 126 is fluidly coupled to a low-pressure, garden hose style fitting 128 for coupling a garden hose to the pump inlet 126. The water pump 125 uses rotational mechanical energy from the electric motor 120 and provides a high-pressure supply of water at the pump outlet 127. In the embodiment shown in FIG. 9, downstream of the pump outlet 127 is a high-pressure fitting 127A (e.g., an M22 fitting) for coupling to the high-pressure hose 155 or other device including a corresponding high-pressure fitting. In other embodiments, as shown in FIG. 4 and explained below, a jet pump or flow multiplier 300 is located between the pump outlet 127 and the high-pressure fitting 127A. In some embodiments, the high-pressure fitting 127A is fixed relative to the frame 110. The electric motor 120 receives power through an electrical cord 121, which is in turn connected to an electrical supply. Referring to the embodiment shown in FIG. 4, the electrical cord 121 includes an electrical connector, shown as connector 121A, for interfacing with (e.g., electrically connecting to, insertion into, etc.) a standard home power outlet. As shown in FIG. 1, the electrical system includes an electrical disconnect switch 122 configured to selectively electrically decouple (i.e., disconnect) the electrical supply and the electric motor 120.

Figure 5:
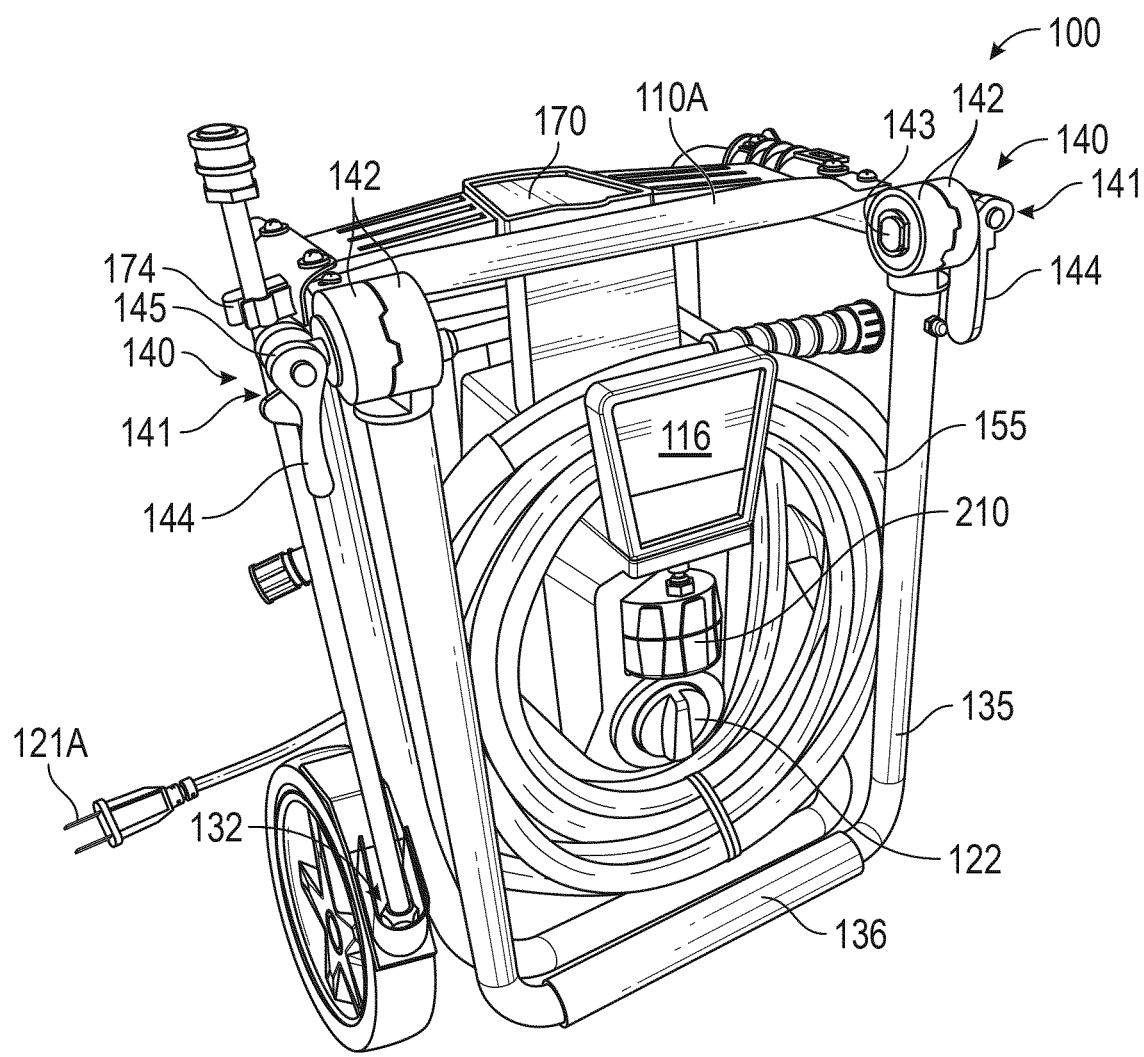
FIG. 5 is another perspective view of the pressure washer of FIG. 1.

The pressure washer 100 is configured to be positioned in two primary orientations: an upright or storage orientation, shown in FIG. 5, and a horizontal or normal operating orientation, shown in FIG. 1. In both orientations, the pressure washer 100 can stand stably on a flat and level surface without any additional support. In the storage orientation, the fully extended or fully retracted handle 135 is in a plane generally perpendicular to the ground. In the normal operating orientation, the fully extended or fully retracted handle 135 is in a plane generally parallel with the ground. The pressure washer 100 can be operated in the normal operating orientation, and may or may not be able to operate in the storage orientation. Accordingly, the pressure washer 100 may be operated in the normal operating orientation, but stored in the storage orientation as a space saving measure. In some embodiments, a number of feet 111 are coupled to the frame 110, such that in both of the primary orientations, the feet 111 and the wheels 130 touch the ground to stabilize the pressure washer 100, instead of the frame 110 touching the ground.

Figure 6A:
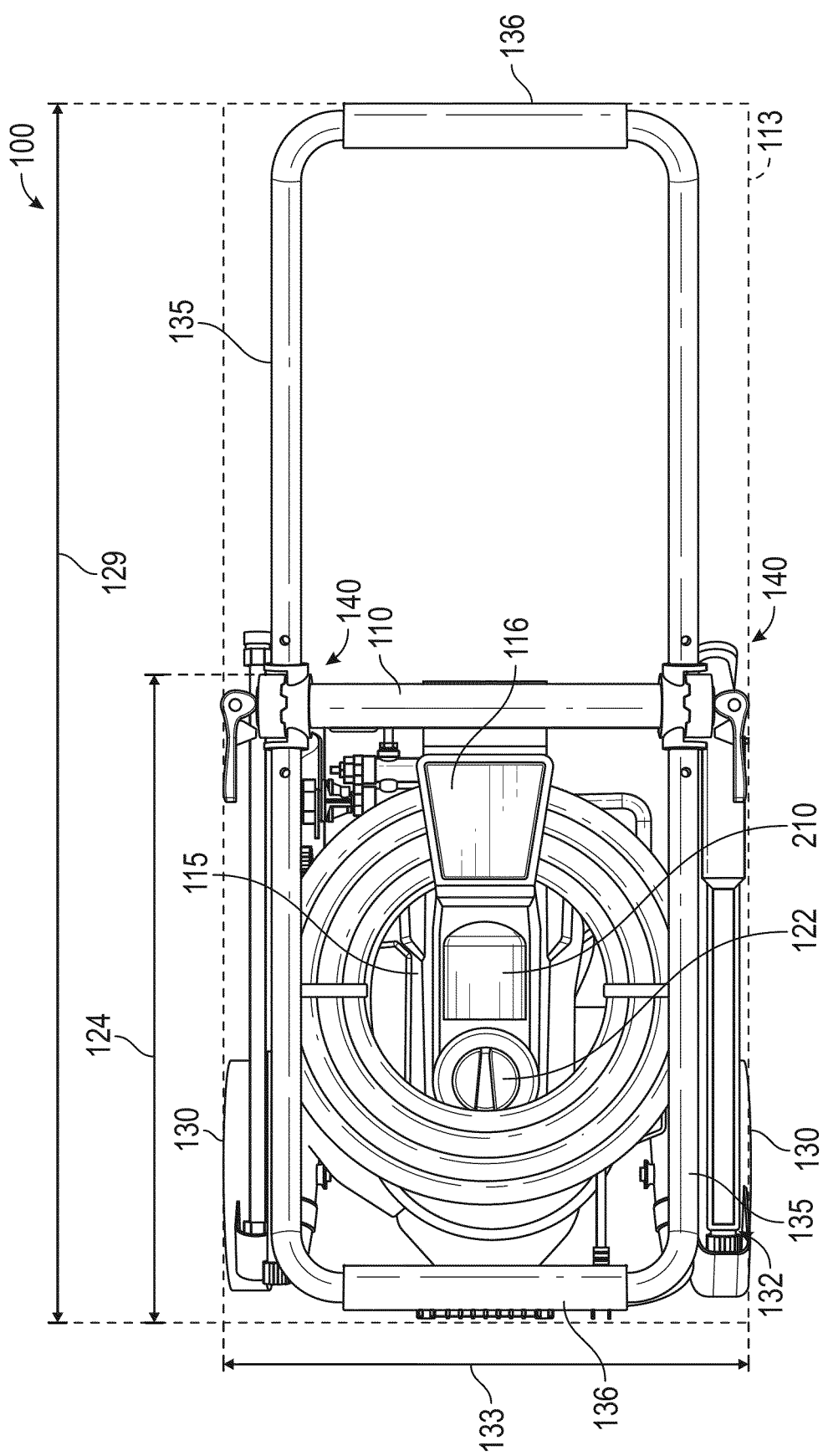
FIG. 6A is a top view of the pressure washer of FIG. 1 in a normal operating orientation.
Figure 6B:
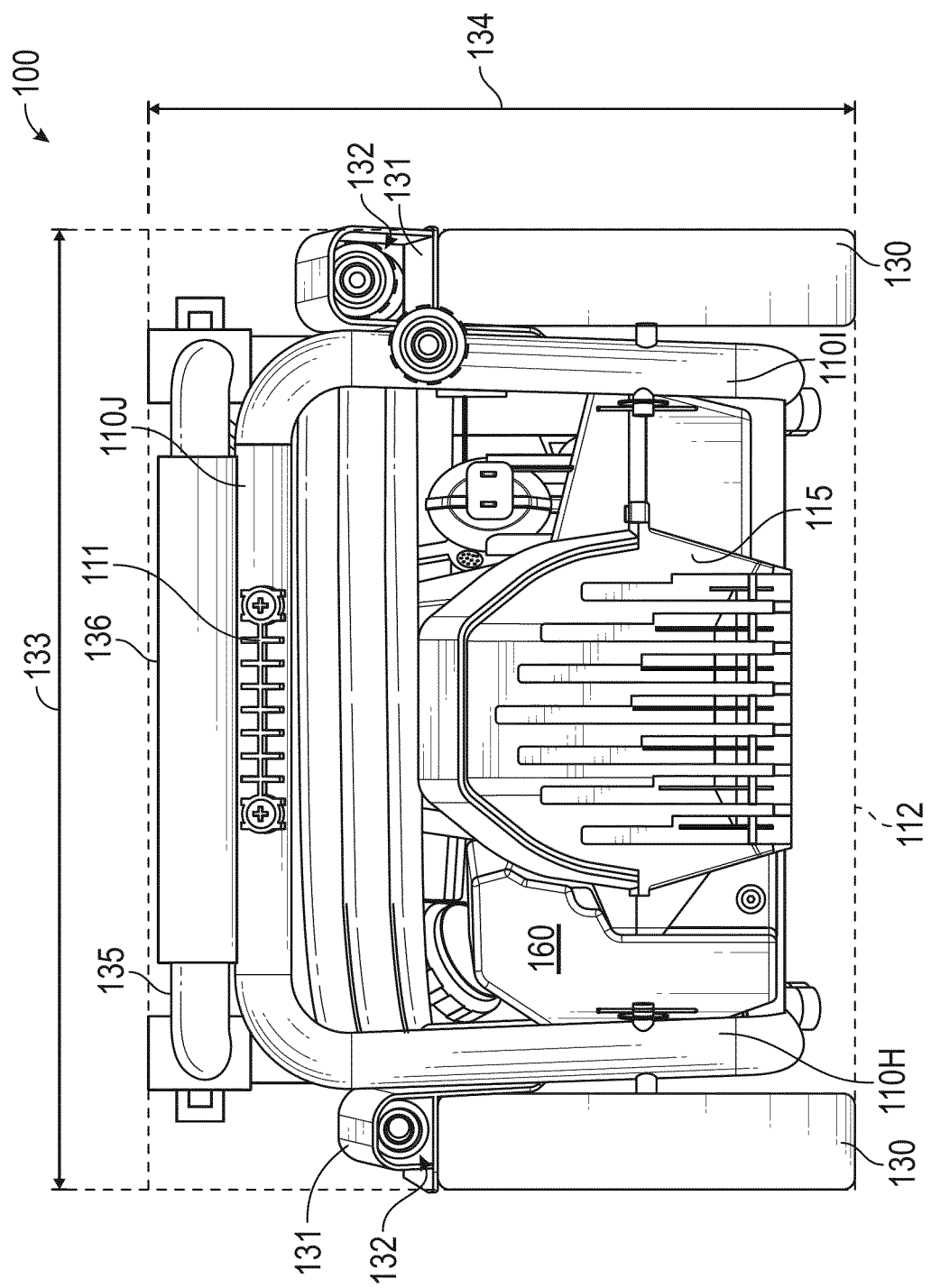
FIG. 6B is a bottom view of the pressure washer of FIG. 1 in a storage orientation.

As shown in FIGS. 6A and 6B, the pressure washer 100 has both a storage footprint 112, measured when the pressure washer 100 is in the storage orientation, and an operation footprint 113, measured when the pressure washer 100 is in the normal operating orientation. A footprint is defined by projecting the shape of the pressure washer 100 onto a flat and level surface in a certain orientation. The footprint is the smallest rectangle which can contain the entirety of this projection. The projection may not take into account various removable components, such as the spray gun assembly 200 or the high-pressure hose 155. FIG. 6A shows a top view of the pressure washer 100, showing the handle 135 in both an extended position and a retracted position for the purposes of illustration. It should be understood, however, that the handle 135 can move between the extended and retracted positions and, accordingly, will not be in both the extended position and the retracted position at one time. FIG. 6B shows a bottom view of the pressure washer 100 in the storage orientation.

The operation footprint 113 of the pressure washer 100 in the normal operating orientation has a length 124 (not including the extended handle 135) and a length 129 (including the extended handle 135) and a width 133 that define its rectangular footprint. The storage footprint 112 of the pressure washer 100 in the storage orientation has a depth 134 and the width 133 that define its rectangular footprint. In one embodiment, the length 124 is 19.763 inches (50.2 centimeters), the length 129 is 37.354 inches (94.88 centimeters), the width 133 is 17.102 inches (43.44 centimeters), and the depth 134 is 12.514 inches (31.79 centimeters), resulting in an operation footprint 113 of 337.989 square inches (2181 square centimeters) when the handle 135 in the storage position, an operation footprint 113 of 638.828 square inches (4121 square centimeters) when the handle 135 is in the extended position, and a storage footprint 112 of 214.014 square inches (1381 square centimeters). The storage footprint 112 has a smaller area than the operation footprint 113 so that the pressure washer 100 takes up less floor space in the storage orientation than in the normal operating orientation, regardless of whether the handle 135 is in the extended position or the storage position. Conventional pressure washers are designed to operate and to be stored in the same orientation. It may be possible to orient some conventional pressure washers in ways other than their normal operating orientation, but these orientations are not intended as operating or storage orientations and the pressure washers would be unstable or otherwise prone to tipping in these unintended orientations.

Figure 7:
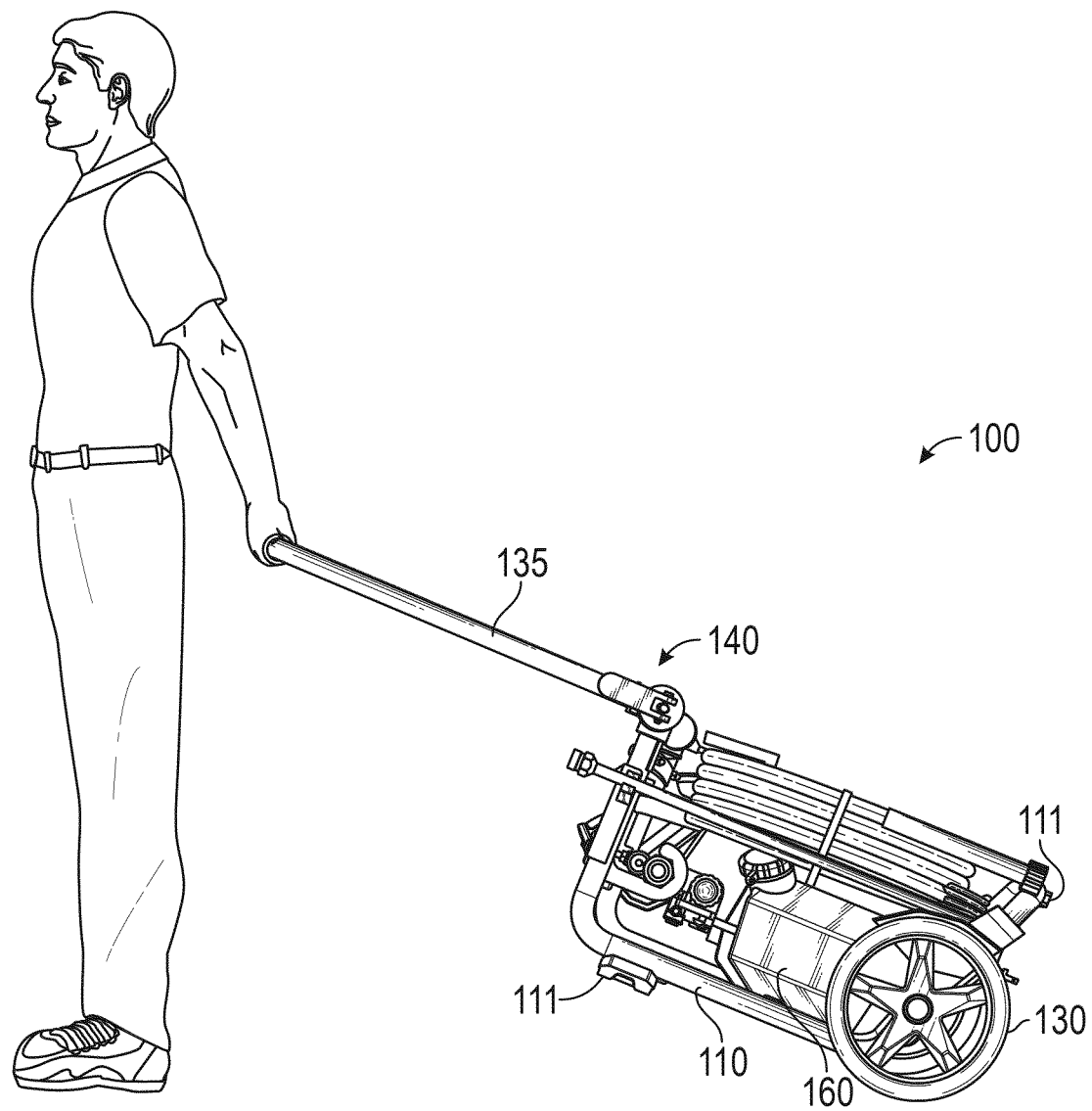
FIG. 7 is a side view of the pressure washer of FIG. 1 in a transport orientation.

Between the two primary orientations is a transportation orientation, as shown in an exemplary embodiment in FIG. 7. In this orientation, the distal end portion of the fully extended handle 135 is positioned at a comfortable height for the user to grasp (e.g., hip height), and the wheels 130 are the only part of the pressure washer 100 touching the ground, facilitating rolling transportation of the pressure washer 100. The exact angle of the pressure washer 100 with respect to the ground in the transportation orientation may vary somewhat between different users (e.g., between 30° and 60°).

In the exemplary embodiment shown in FIGS. 1 and 4, the frame 110 includes multiple frame members, shown as a front lateral member 110A, a pair of front vertical members 110B, 110C, a pair of longitudinal members 110D, 110E, a pair of central lateral members 110F, 110G, a pair of angled members 110H, 110I, and a rear lateral member 110J. In alternative embodiments, the arrangement of the frame 110 differs from that shown in FIGS. 1 and 4 (e.g., includes different members, includes the same members in different orientations, etc.). In the exemplary embodiment shown in FIG. 1, the frame members are arranged around the center of mass of the pressure washer 100 in such a way as to provide convenient, balanced handles or lifting points for the user. The frame members may be shaped (e.g., bent, machined, etc.) and/or fastened (e.g., bolted, welded, etc.) in order create the structure of the frame 110. The frame 110 and the handle 135 may be constructed from various structural materials (e.g., bent sheet metal, cast metal, molded plastic). In some embodiments, the frame 110 and handle 135 are constructed from tubes or tubular components (e.g., square or round tube stock). In some embodiments, the frame 110 frame is considered to be the body 114 of the pressure washer 100. In other embodiments, the pressure washer 100 does not include an externally visible frame and instead includes a housing or enclosure that is considered to be the body 114 of the pressure washer 100, where the housing or enclosure provides functionality similar to the frame 110 as described herein (e.g., mounting locations for the wheels 130 and the feet 111, attachment points for the handle 135, support of the water pump 125 and the motor 120, etc.). This housing or enclosure may include the housing 115.

As shown in FIG. 2, the body 114 has a first side 114A that is configured to be proximate to a surface supporting the pressure washer 100 (e.g., the ground, the top surface of a table, a truck bed, etc.) when the pressure washer 100 is in its normal operating orientation. The length of the first side 114A (e.g., the length 124) can be measured with the pressure washer 100 on a flat, level surface in the storage orientation as the distance from the surface supporting the pressure washer 100 to the highest point of the pressure washer 100. The body 114 includes a second side 114B that is configured to be proximate to the surface supporting the pressure washer 100 when in the storage orientation. The depth of the second side 114B (e.g., the depth 134) can be measured with the pressure washer 100 in the normal operating orientation as the distance from the surface supporting the pressure washer 100 to the highest point of the pressure washer 100. In the exemplary embodiment shown in FIG. 2, the length 124 of the first side 114A is measured substantially parallel to the axis of rotation 120B of the motor shaft 120A, and the depth of the second side 114B is measured substantially perpendicular to the axis of rotation 120B of the motor shaft 120A. In some embodiments, the depth of the second side 114B is less than the length of the first side 114A. In some embodiments, the depth of the second side 114B is 12.514 inches (31.79 centimeters) and the length of the first side 114A is 19.763 inches (50.2 centimeters) with the handle 135 in the storage position and 37.354 inches (94.88 centimeters) with the handle 135 in the extended position.

Using the handle 135, the user can support a portion of the weight of the pressure washer 100 and manipulate (e.g., push, pull, etc.) the pressure washer 100. In the specific embodiment shown in FIG. 1, the handle 135 includes multiple frame members, shown as a pair of longitudinal members 135A, 135B and an interface member 135C. In alternative embodiments, the arrangement of the handle 135 differs from that shown in FIG. 1 (e.g., the handle 135 includes different members or includes the same members in different orientations). In the exemplary embodiment shown in FIG. 1, the handle 135 is formed from one singular piece of bent material. In alternative embodiments, the handle 135 is formed from a number of individual pieces of material coupled together (e.g., by welding, using fasteners, etc.). In some embodiments, the handle 135 includes a handle grip 136 surrounding the interface member 135C to reduce any slippage between the user's hand and the handle 135.

As shown in FIGS. 1 and 4, the wheels 130 are rotatably coupled to the frame 110 (e.g., directly or indirectly by an intermediate member) near the intersections between the angled members 110H, 110I and the longitudinal members 110D, 110E. In some of these embodiments, the wheels 130 are concentrically aligned with one another such that both wheels 130 rotate about a common axis of rotation. Placement of the wheels 130 in this location allows the entire frame 110 to be rotated freely about the axis of rotation of the wheels 130 between the two primary orientations. The handle 135 connects to the frame 110 near the intersection between the front lateral member 110A and the front vertical members 110B, 110C, directly opposing the location of the wheels 130. This places the handle 135 in a location such that its distal end portion (e.g., defined by the handle grip 136), when the handle 135 is fully extended, is located off of the ground regardless of which of the two primary orientations is chosen. This facilitates the user grabbing hold of the handle 135 without reaching all the way to the ground regardless of the orientation. The housing 115 is located near the center of the frame 110. This places the center of gravity somewhere between the wheels 130 and the distal end of the fully extended handle 135, forcing the user to impart a constant upward force on the handle 135 when the pressure washer 100 is in the transportation orientation. As shown in an exemplary embodiment in FIG. 2, in the pressure washer 100, the wheels 130 are near the rear lateral member 110J of the frame 110. The electric motor 120 extends forward of the wheels 130, and the pump 125 extends forward of the electric motor 120. Additionally, the high-pressure fitting 127A is located forward of the electric motor 120 in some embodiments. This differs from conventional pressure washer designs, where the distance between the pump and the wheels and the distance between the high-pressure fitting and the wheels are both less than the distance between the motor and the wheels. Additionally, in some embodiments, the axis of rotation 120B of the motor shaft 120A is oriented substantially perpendicular to that of the wheels 130.

Figure 8:
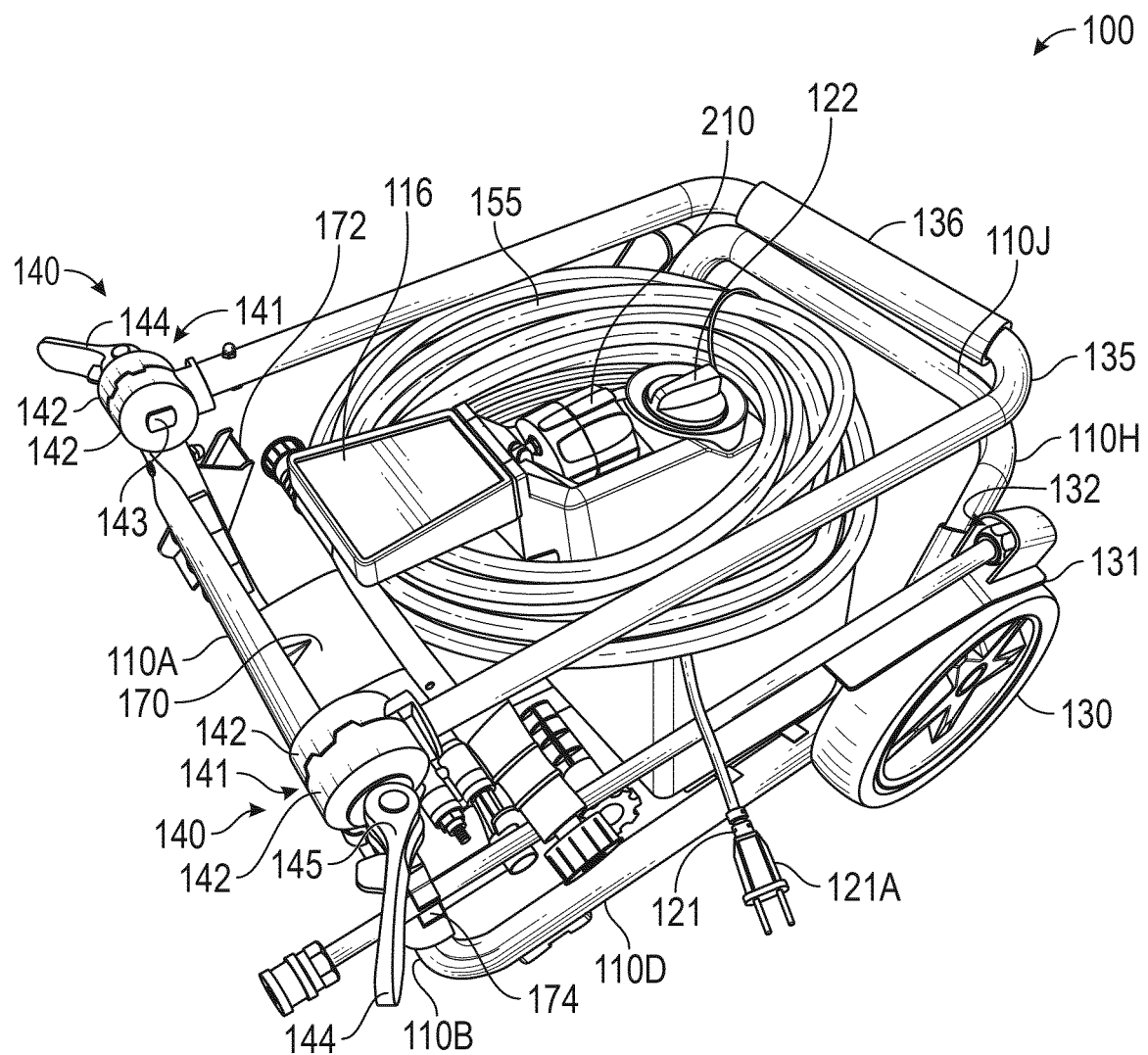
FIG. 8 is another perspective view of the pressure washer of FIG. 1.

A proximal end portion of the handle 135 is shown in FIGS. 1 and 8 as being coupled to a front end portion of the frame 110 through one or more joints, shown as rotating joints 140, which allow the handle 135 to rotate relative to the frame 110. Each rotating joint 140 includes a locking mechanism 141 that allows the user to selectively lock joint 140 (i.e., prevent joint 140 from rotating). In the exemplary embodiment shown in FIG. 8, each locking mechanism 141 includes a pair of joint bodies 142, a shaft 143, and a lever 144. The joint bodies 142 are attached to the frame 110 and the handle 135, respectively. A hole through the center of both joint bodies 142 defines an axis of rotation of the handle 135 relative to the frame 110. The shaft 143 extends through this hole along this axis of rotation. The lever 144 is rotatably coupled to the end of the shaft 143 and includes a cam 145 that presses against one of the joint bodies 142. The end of the shaft 143 opposite the lever 144 is prevented from translating relative to the other of the joint bodies 142 by a stop (e.g., a snap ring or step in the shaft 143 that presses against a joint body 142, etc.). When the lever 144 is rotated, the cam 145 then presses against the surface of one joint body 142, forcing the joint bodies 142 closer together. A set of grooves and corresponding raised ridges on the mating surfaces of the joint bodies 142 interlock, preventing rotation. Rotating the lever 144 back to its original position rotates the cam 145 so that it does not press the joint bodies 142 as close together, allowing the joint bodies 142 to separate again, which in turn allows the handle 135 to rotate. In some embodiments, a compression spring is located between the joint bodies 142 to facilitate separation once the cam 145 is rotated away from the joint body 142. In other embodiments, the locking mechanism 141 uses a different method of preventing rotation, such as pushing a pin through both joint bodies 142 or using a threaded connection to force the joint bodies 142 together.

The handle 135 has two primary rotational positions relative to the frame 110. When the pressure washer 100 is in use, the handle 135 will remain in an extended position, as shown in FIG. 1, where the distal end portion of the handle 135 is moved away (i.e., separated) from the frame 110. In the extended position, the handle 135 provides the user with a lever arm to rotate the center of mass of the pressure washer 100 about the axis of rotation of the wheels 130. In a storage position, shown in FIG. 8, the handle 135 covers the pressure washer 100, adopting a similar footprint to that of the frame 110. In this position, the distal end portion of the handle 135 is positioned near a rear end portion of the frame 110. This drastically reduces the overall storage volume or envelope of the pressure washer 100, which reduces the amount of storage volume needed to store the pressure washer 100 when not in use, especially when compared to conventional pressure washers with fixed handles. In some embodiments, the electrical cord 121 and high-pressure hose 155 can be arranged in a coiled position and stored on a hook 116, which extends from the housing 115. When the handle 135 is in the storage position, a volume is defined by (e.g., defined surrounding, defined between, etc.) the frame 110 and the distal and proximal end portions of the handle 135. This volume at least partially contains many of the components of the pressure washer 100 (e.g., the housing 115, the electric motor 120, the pump 125, etc.), as shown in FIGS. 2 and 8. The electrical cord 121 and the high-pressure hose 155 are enclosed by or extend within this volume when in their respective coiled positions. With the handle 135 in the storage position, the coiled electrical cord 121 and high-pressure hose 155 are clamped between the handle 135 and one or more of the frame 110 and the housing 115. This prevents the electrical cord 121 and the high-pressure hose 155 from translating relative to the hook 116 or unraveling due to vibration or other external loading during transport or storage, thereby securing the high-pressure hose 155 and the electrical cord 121 in their respective coiled positions. For example, a user may wish to transport the pressure washer 100 in the bed of a truck or trailer, which would expose the pressure washer 100 to strong winds and substantial vibration. Whereas the hose or electrical cord of a conventional pressure washer with no method of securing the hose or electrical cord might come free or uncoiled in this situation, the clamping action of the handle 135 prevents the hose 155 and electrical cord 121 from moving relative to the rest of the pressure washer 100.

In some embodiments, the amount of components attached directly to the handle 135 is minimized. This allows the user to rotate the handle 135 between the two primary positions with minimal resistance. For example, if the high-pressure hose 155 were to be attached to the handle 135 directly, the high-pressure hose 155 would have to be moved in order to rotate the handle 135. In one of the preferred embodiments, the handle 135 is substantially free from having any component other than rotating joints 140 attached to or mounted to the handle 135 (e.g., no hooks for mounting spray guns, no mounting points to hold high-pressure hoses, no spray tips, etc.). In another embodiment, the handle 135 only has components attached to it that still allow a user to freely move the handle 135 between the storage position and the use position without requiring the user to touch or interact with any other component. For example, spray nozzles or other small components can be mounted to the handle 135 without requiring the user to move or remove them from the handle 135 prior to moving the handle 135. Smaller components could be mounted the handle 135, but other larger components (e.g., the hose 155, the spray gun assembly 200, etc.) do not attach to the handle 135.

The pump 125 of pressure washer 100 is powered by electric motor 120 instead of an internal combustion engine. Accordingly, the pressure washer 100 does not require an onboard fuel source (e.g., a tank for storing gasoline or diesel fuel). The pressure washer 100 may store chemicals (e.g., detergents, soap, rinse agents) that are able to be mixed with projected water. The chemicals are contained in a chemical storage tank, shown as tank 160 in FIGS. 9-12C, which includes a fill neck 161 and a cap 162. In some embodiments, the tank 160 is located along a lateral side of the housing 115 near the center of the frame 110 with respect to front and back of the frame 110. The tank 160 may be coupled to one or more of the housing 115 and the frame 110. In order to prevent fluids from spilling out of the tank 160, an air pocket is maintained in the fill neck 161 throughout the transition between the storage orientation and the normal operating orientation. This is accomplished by placing the fill neck 161 on the corner of the tank 160, such that the fill neck 161 is the uppermost part of the tank 160 at every orientation when transitioning between the storage orientation and the normal operating orientation. If the fill neck 161 were placed in another location on the tank 160, the fluids would put pressure on the cap 162 in one or more orientations and risk leakage, particularly in situations where the cap 162 is not attached or is improperly attached. Employing similar reasoning, a chemical outlet 163, shown in an exemplary embodiment in FIG. 4, is located on the opposite corner of the tank 160 such that any fluid in the tank 160 contacts the chemical outlet 163 regardless of which of the two primary pressure washer orientations is chosen. The fill neck 161 is oriented partially laterally outward from the pressure washer 100 (e.g., 30 degrees from vertical) in order to facilitate user access to the open end of the fill neck 161.

The chemical outlet 163 is fluidly coupled (e.g., by a hose or conduit) to a chemical injection device 320 to selectively supply chemicals stored in the tank 160 to the output water flow.

Figure 12A:
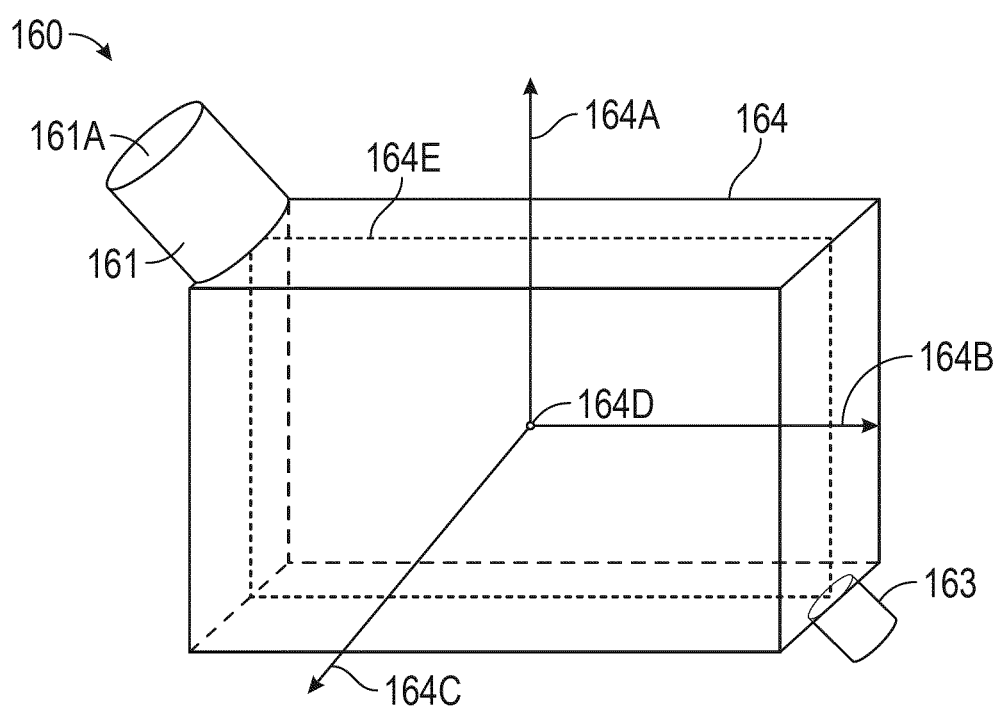
FIG. 12A is a schematic perspective view of the storage tank of FIG. 10.
Figure 12C:
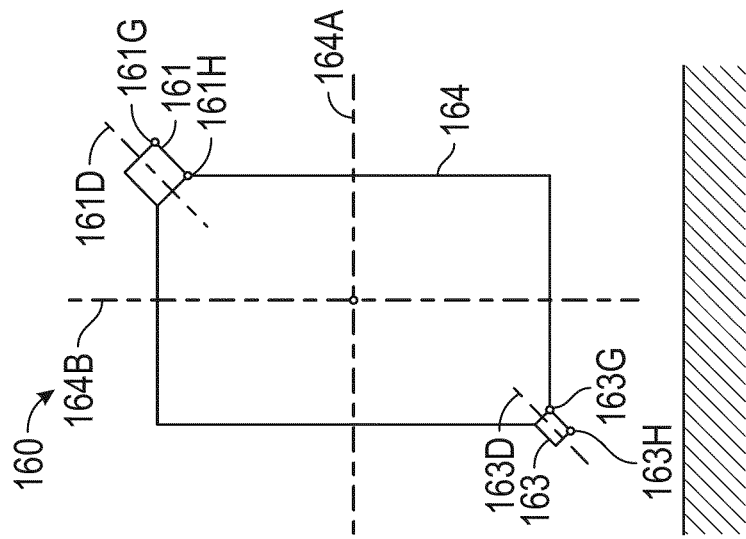
FIG. 12C is schematic section view of the storage tank of FIG. 10 in the storage orientation.
Figure 12B:
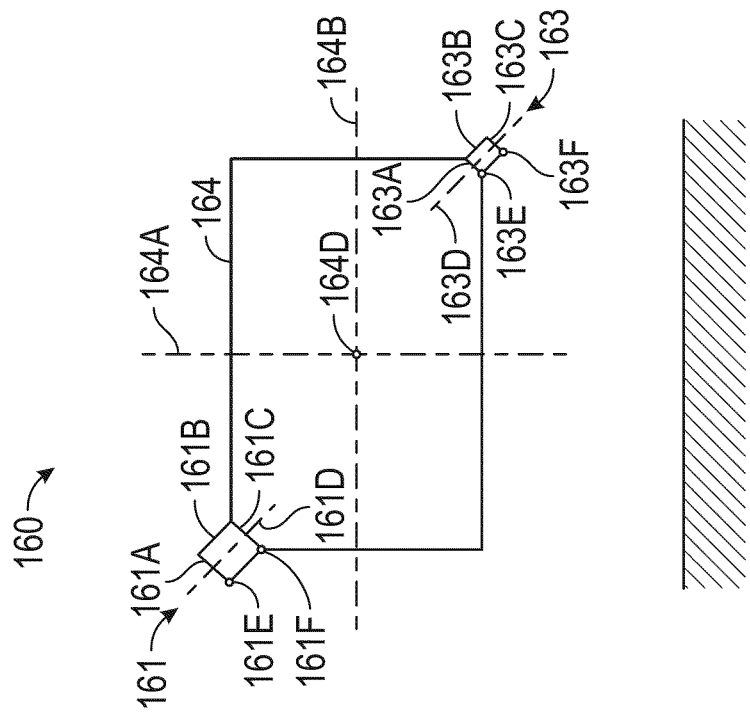
FIG. 12B is schematic section view of the storage tank of FIG. 10 in the normal operating orientation.

The tank 160 includes a tank body 164, which may have various shapes (e.g., rectangular, cylindrical, spherical, organically shaped, etc.). The tank body 164 defines a storage volume configured to contain chemicals. A method of locating the fill neck 161 and chemical outlet 163 regardless of the tank body 164 shape is shown in FIGS. 12A-12C according to an exemplary embodiment. The tank body 164 includes a first axis 164A (e.g., a vertical axis) that is parallel to the direction of gravity in the normal operating orientation and a second axis 164B (e.g., a horizontal axis) that is parallel to the direction of gravity in the storage orientation. The angle between the first axis 164A and the second axis 164B may vary between different embodiments. The tank body 164 also includes a depth axis 164C perpendicular to both the first axis 164A and the second axis 164B. The axes 164A, 164B, 164C all intersect at a center point 164D. A center plane 164E is defined such that both the first axis 164A and the second axis 164B lie completely within the center plane 164E. The fill neck 161 defines an inlet opening 161A, a fill passage 161B fluidly coupled to the inlet opening 161A, and an outlet opening 161C fluidly coupled to the tank body 164 and the fill passage 161B. A central axis 161D of the fill neck 161 runs along the center of the fill passage 161B. Likewise, the chemical outlet 163 defines an inlet opening 163A fluidly coupled to the tank body 164, a drain passage 163B fluidly coupled to the inlet opening 163A, an outlet opening 163C fluidly coupled to the drain passage 163B, and a central axis 163D that runs along the center of the drain passage 163B. In some embodiments, the central axis 161D and/or the central axis 163D are angled (e.g., between 10 and 80 degrees, between 30 and 60 degrees, etc.) relative to the center plane 164E.

When in the normal operating orientation, shown in FIG. 12B, the fill neck 161 has a lowest point 161E on the inlet opening 161A and a lowest point 161F on the outlet opening 161C. When in the storage orientation, shown in FIG. 12C, the fill neck 161 has a lowest point 161G on the inlet opening 161A and a lowest point 161H on the outlet opening 161C. In order to prevent spilling, point 161F is lower than point 161E in the normal operating orientation, and point 161H is lower than point 161G in the storage orientation. Accordingly, the outlet opening 161C is positioned below the inlet opening 161A in both the storage orientation and the normal operating orientation. When in the normal operating orientation, the chemical outlet 163 has a lowest point 163E on the inlet opening 163A and a lowest point 163F on the outlet opening 163C. When in the storage orientation, chemical outlet 163 has a lowest point 163G on the inlet opening 163A and a lowest point 163H on the outlet opening 163C. In order to ensure that the tank 160 can be emptied completely, point 163F is lower than point 163E in the operating orientation, and point 163H is lower than point 163G in the storage orientation. Accordingly, the outlet opening 163C is positioned below the inlet opening 163A in both the storage orientation and the normal operating orientation.

Figure 10:
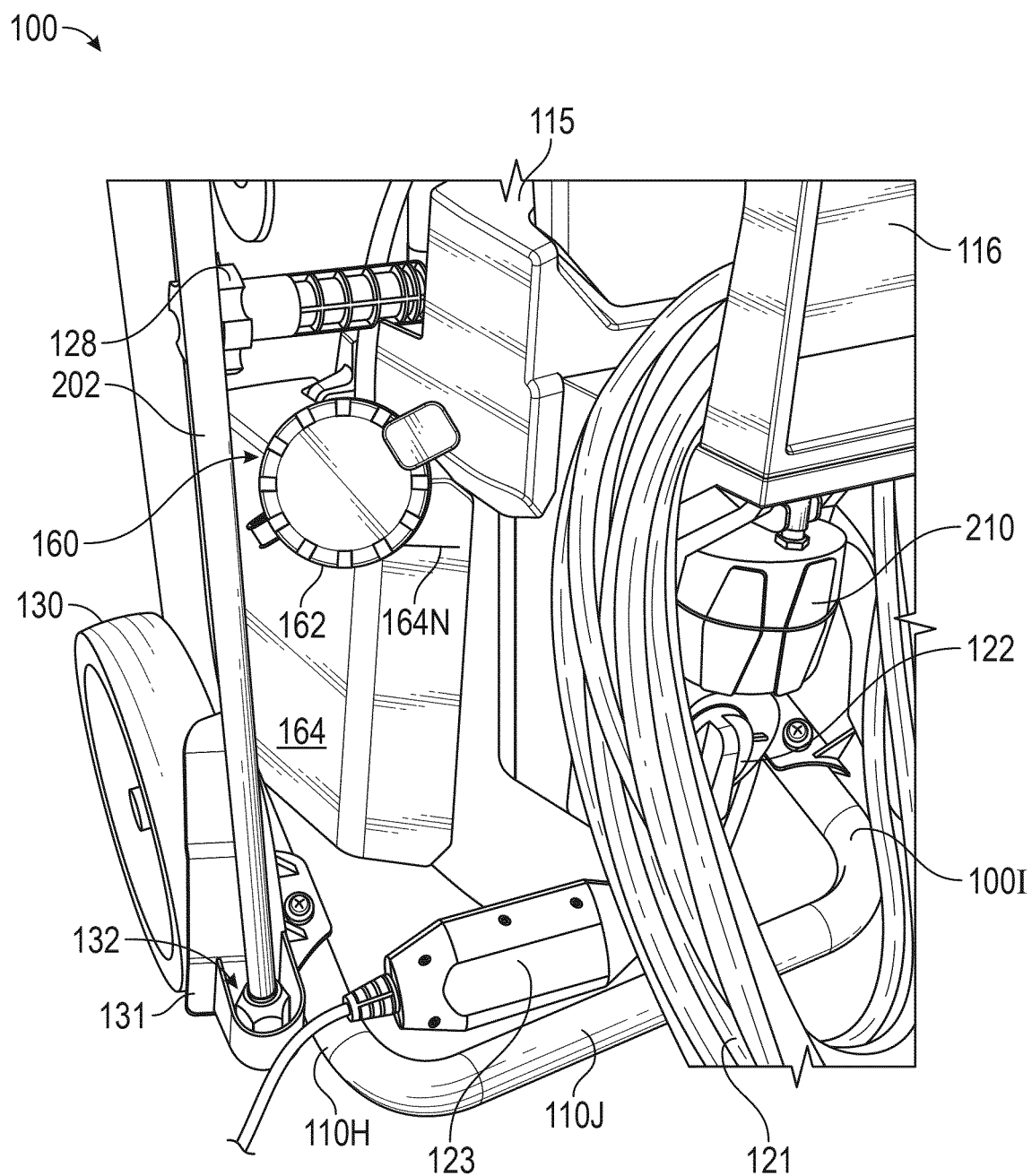
FIG. 10 is a perspective view of a storage tank of the pressure washer of FIG. 1.
Figure 11:
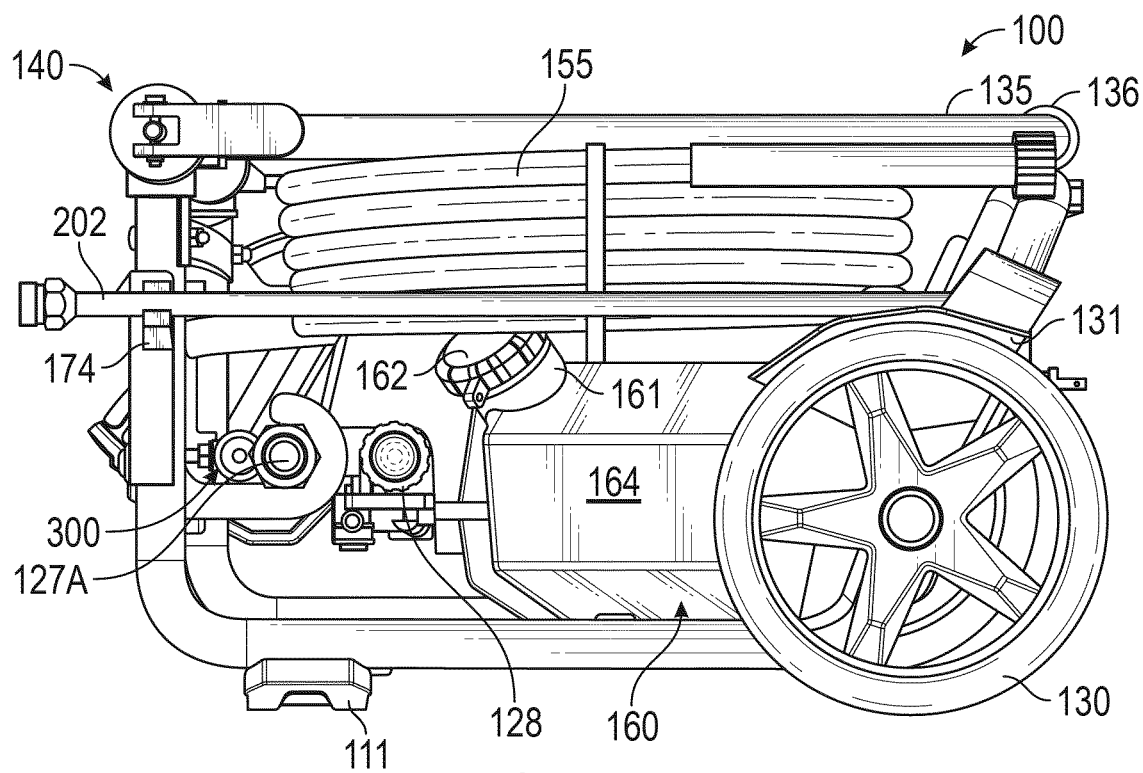
FIG. 11 is another side view of the pressure washer of FIG. 1.

In some embodiments, if the tank 160 were to be filled completely with fluid in one orientation, there would be potential for spillage when transitioning between the normal operating orientation and the storage orientation. In order to prevent spillage, one or more indication marks 164N (e.g., indentations, etchings, ink markings, etc.), shown according to an exemplary embodiment in FIG. 10, are added on the exterior of the tank 160. These marks 164N indicate the maximum level to which the tank 160 may be filled in one orientation without spilling in another orientation. The marks 164N may be a line, a series of dots, or another shape. In some embodiments, the tank 160 is transparent or translucent to allow the user to more readily determine the fluid level.

Figure 13:
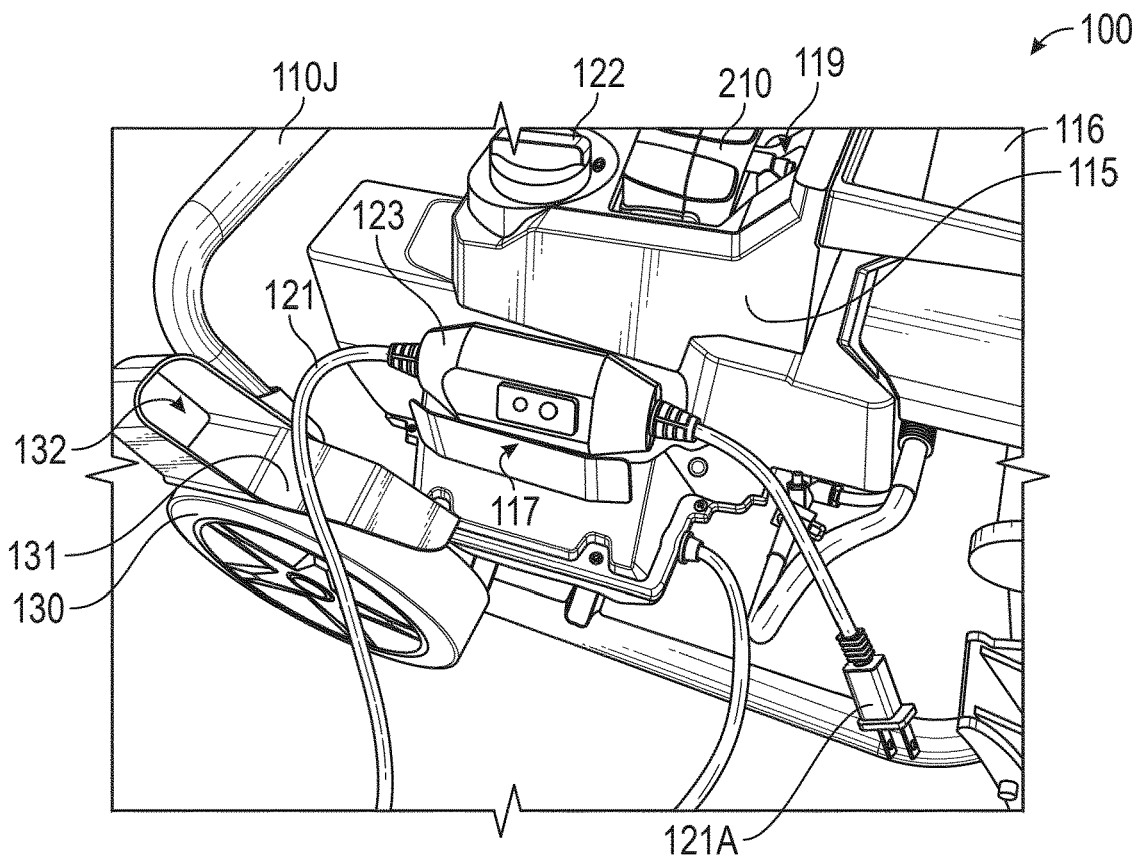
FIG. 13 is a perspective view of a ground fault circuit interrupter unit (GCFI) of the pressure washer of FIG. 1
Figure 14:
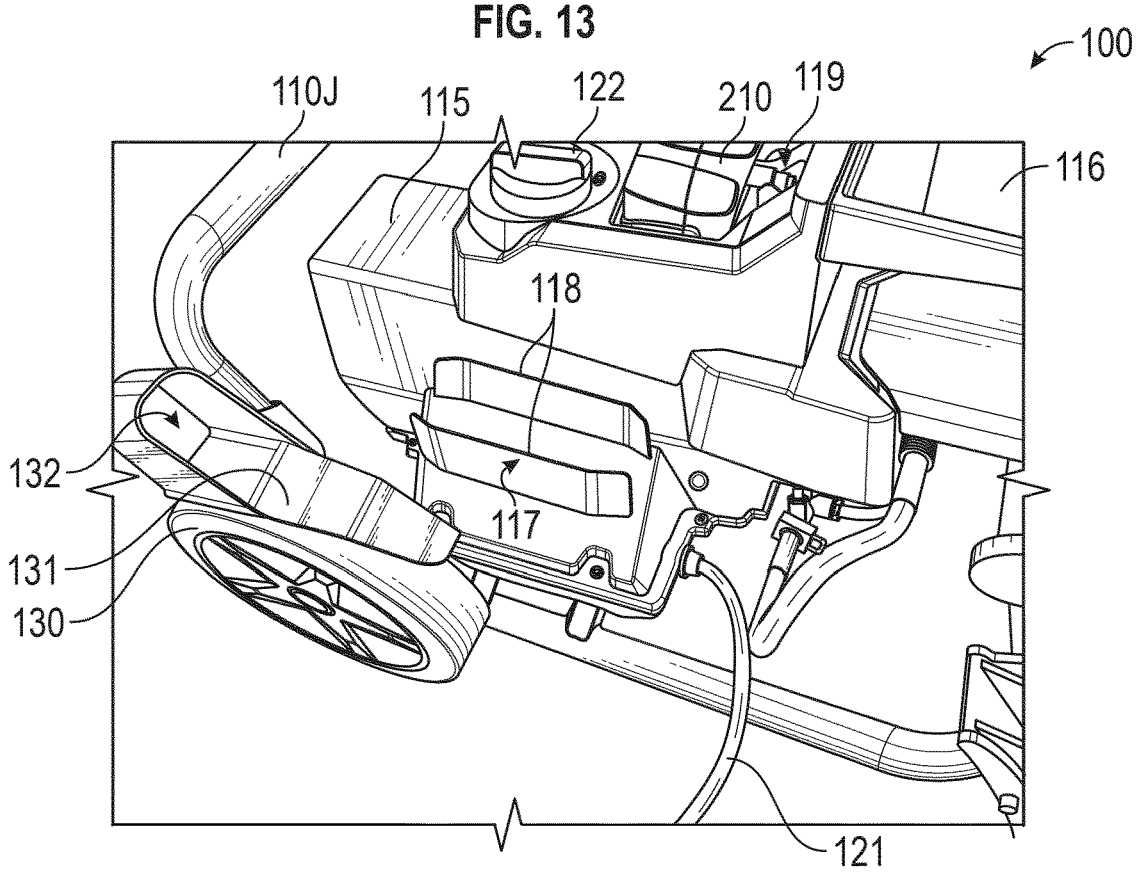
FIG. 14 is a perspective view of a GFCI holder for the GFCI of FIG. 13.

Referring to FIGS. 13 and 14, the electrical system of the pressure washer 100 includes ground fault protection in the form of a ground fault circuit interrupter unit (GFCI) 123. The GFCI 123 detects the difference between the current flowing into and out of the pressure washer 100. The GFCI 123 interrupts (i.e., electrically decouples, disconnects) the electrical circuit powering the pressure washer 100 if this current difference exceeds a certain threshold amount (e.g., 5 milliamps) indicative of a ground fault. The GFCI 123 includes a system for resetting the circuit (e.g., one or more buttons that may be selectively pressed by a user). In some embodiments, as shown in FIG. 13, the GFCI 123 is located along the length of the electrical cord 121. In other embodiments, the GFCI 123 is incorporated directly into the connector 121A or the housing 115.

Referring to FIG. 1, in some embodiments, the housing 115 includes the electrical disconnect switch 122. In other embodiments, the electrical disconnect switch 122 is located elsewhere or omitted entirely. As shown in FIG. 1, attached to the housing 115 is a hook 116 that extends outward from the housing 115. In some embodiments, a portion of the hook 116 extends substantially parallel to the fully extended handle 135. In some embodiments, the hook 116 is integrally formed with the housing 115. In a storage configuration, the high-pressure hose 155 and the electrical cord 121 can each be coiled around the hook 116 in a coiled position as shown in FIGS. 1, 2, and 5, such that the high-pressure hose 155 and the electrical cord 121 are supported by and hang down from the hook 116 while the pressure washer 100 is in the storage orientation. The exact locations of the high-pressure hose 155 and the electrical cord 121 in their respective coiled positions may vary, as long as the high-pressure hose 155 and the electrical cord 121 are coiled around a portion of the hook 116. By way of example, the electrical cord 121 may have more or fewer coils, may be a greater or smaller diameter, and may have various positions relative to the high-pressure hose 155 (e.g., behind, in front of, wrapped around, etc.) while still being in the coiled position.

The housing 115 includes a holder or GFCI cradle 117. In some embodiments, as shown in FIGS. 13 and 14, the GFCI cradle 117 includes one or more walls 118. These walls 118 may have a bent or raised portion to capture the GFCI 123 and prevent the GFCI 123 from translating relative to the housing 115. In some embodiments, there is a space between the walls 118 to allow the electrical cord 121 to pass through the GFCI cradle 117. In the storage configuration, one or more of the high-pressure hose 155 and electrical cord 121 press against the GFCI 123 while in their respective coiled positions, holding the GFCI 123 in the GFCI cradle 117. In some embodiments, the GFCI 123 is held in the GFCI cradle 117 by a friction fit against the walls 118. In some embodiments, as shown in FIG. 1, the housing 115 includes an indentation 119 for storing a turret nozzle, shown as nozzle 210. The indentation 119 includes an attachment mechanism for holding the nozzle 210 in place (e.g., an extension that snaps around a fitting of the nozzle 210, holding it in place, etc.).

Figure 9:
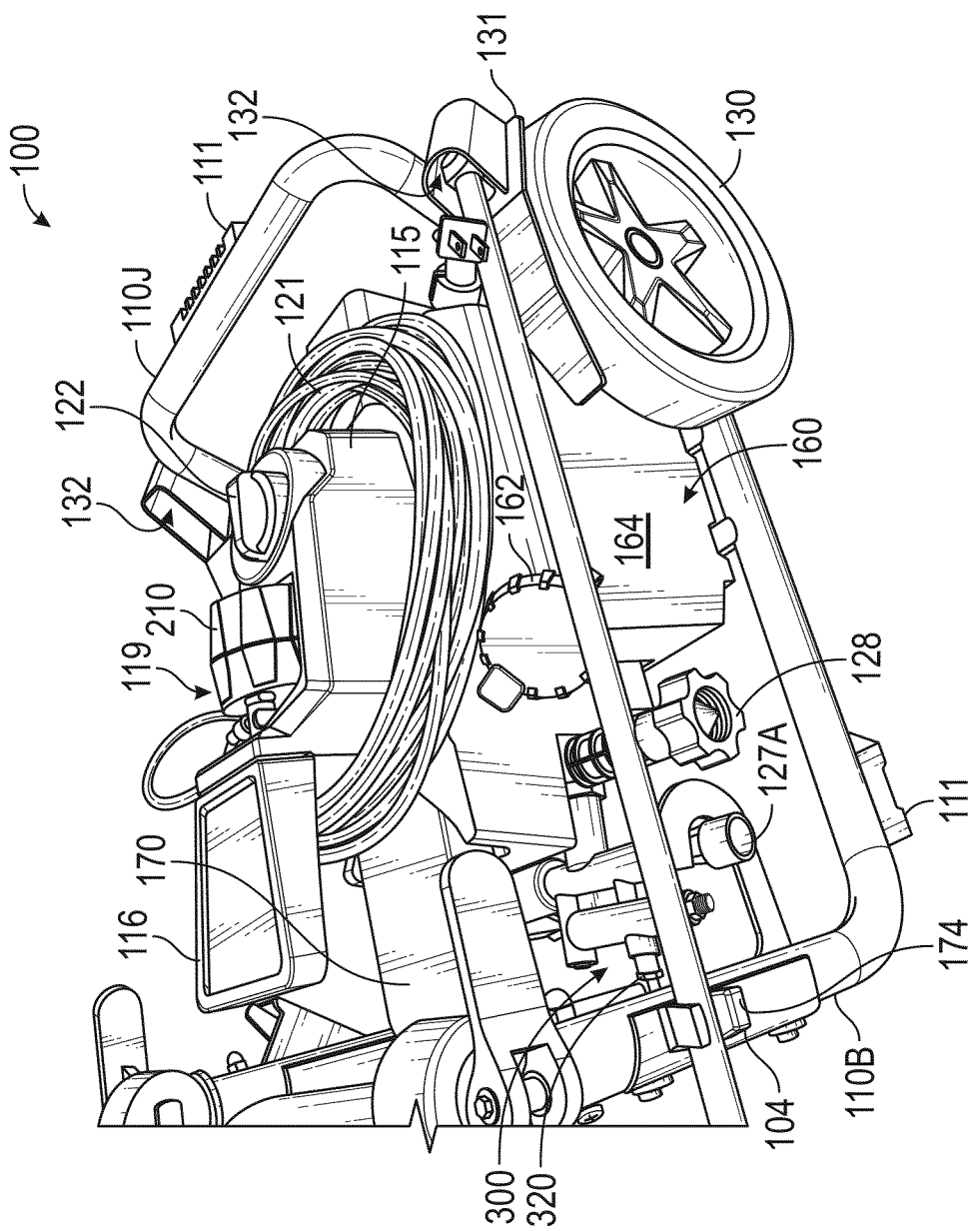
FIG. 9 is another perspective view of the pressure washer of FIG. 1.

Referring to FIGS. 1 and 9, one or more fenders 131 are coupled to the frame 110. These fenders 131 cover a portion of the wheels 130, but do not interfere with the rotation of the wheels 130. The areas of the wheels 130 covered by the fenders 131 face upward from the pressure washer 100 in the normal operating orientation. The fenders 131 extend directly between the wheels 130 and the high-pressure hose 155 and directly between the wheels 130 and the electrical cord 121 to prevent the electrical cord 121 and the high-pressure hose 155 from contacting the wheels 130. This prevents wear (e.g., from rubbing against the wheels 130) and entanglement of the high-pressure hose 155 and the electrical cord 121 while the pressure washer 100 is in motion. Additionally, in some embodiments, the one or more fenders 131 each include a pocket or chamber that defines an aperture 132.

Figure 15:
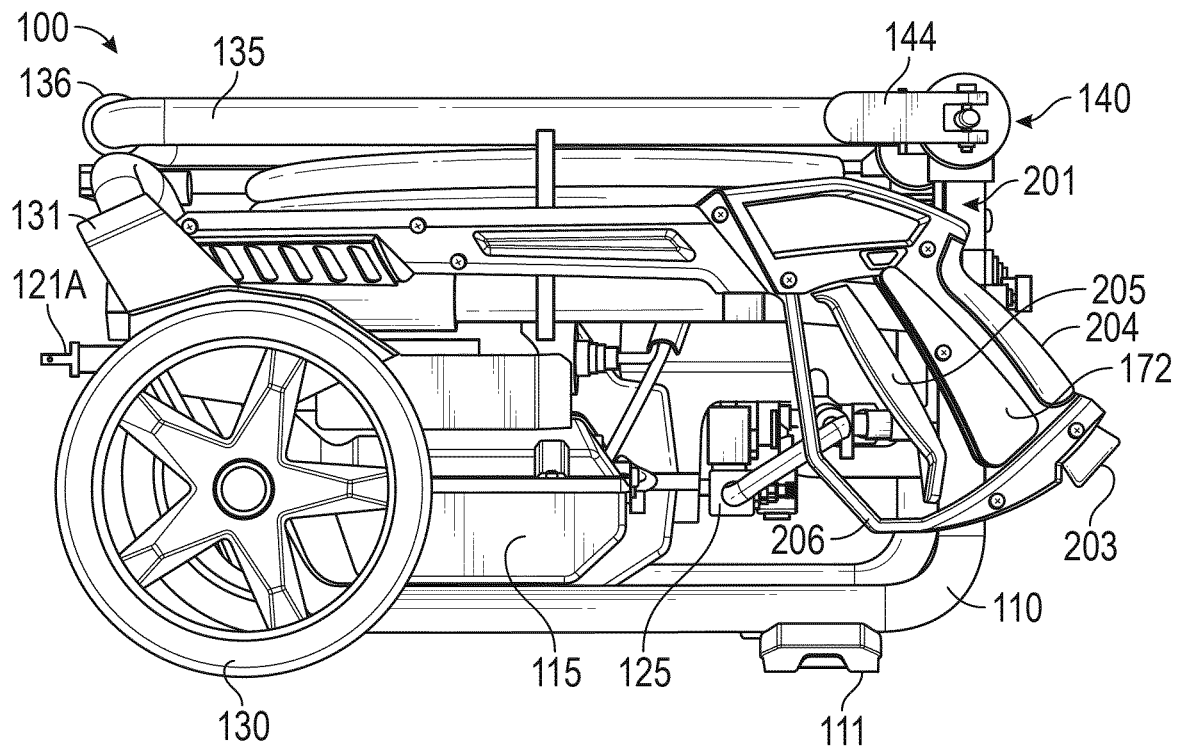
FIG. 15 is another side view of the pressure washer of FIG. 1.

The spray gun assembly 200, shown assembled in FIG. 3, includes a gun 201 and a wand 202. The gun 201 includes a high-pressure fitting 203 for connecting to the high-pressure hose 155. As shown in FIG. 15, the gun 201 is shaped such that it includes a handle or grip 204 through which the user can support the force imparted on the spray gun assembly 200 by the spraying water and manipulate the gun 201 to direct the water spray. The gun 201 includes a flow control valve or fluid control valve and a trigger 205 (or other user-activated input device) to allow the user to control water flow through the spray gun assembly 200. In some embodiments, the gun 201 also includes a guard 206 that extends partially around the trigger 205 such that something must enter the guard 206 in order to press the trigger 205, preventing the flow from starting accidentally. In some embodiments, the gun 201 includes a secondary switch that must be pressed along with the trigger 205 to start the flow. The gun 201 is releasably coupled to the wand 202 (e.g., by a threaded connection, by a high-pressure fitting, etc.) such that the water flows through the gun 201 and into the wand 202. The wand 202 includes a length of rigid tube. On the end of the wand 202 opposite the gun 201, the wand 202 connects to the nozzle 210 (e.g., by way of a high-pressure fitting, etc.). Increasing the length of the spray gun assembly 200 increases the distance between the user and the jet of fluid leaving the nozzle 210. This provides the user with additional precision control of the direction of the jet of fluid. In some embodiments, the wand 202 is excluded and the nozzle 210 connects directly to the gun 201. In some embodiments, the spray gun assembly 200 and nozzle 210 can be replaced with another spray gun assembly configured for a different application (e.g., a spray gun with a long wand and a curved end used for cleaning out gutters).

Referring to the exemplary embodiment shown in FIG. 5, the nozzle 210 is shown. The nozzle 210 in the embodiment shown includes multiple individual nozzles with different fixed geometries incorporated into one assembly, such that each nozzle can be selected without disconnecting and reconnecting the entire assembly (e.g., using a rotating, revolver style assembly as shown in FIG. 5). The nozzle 210 is releasably coupled to the spray gun assembly 200 (e.g., at the end of the wand 202 or at the end of the gun 201). The geometry of the nozzle 210 defines the spray pattern of the jet of fluid that leaves the pressure washer 100, the force of the jet, and the resultant back pressure in the high-pressure hose 155. For example, a nozzle 210 with a relatively small effective flow area can create a relatively high back pressure, a relatively narrow spray pattern, and a relatively high jet force. Different spray patterns and jet forces are useful for different applications. For example, a wide spray pattern, low force jet would be useful when washing soap off of a car, whereas a small diameter, high force jet would be more useful when cleaning concrete. In other embodiments, nozzle 210 is one fixed-geometry nozzle. In yet other embodiments, nozzle 210 is a series of separate nozzles, each with a different fixed geometry.

Figure 16:
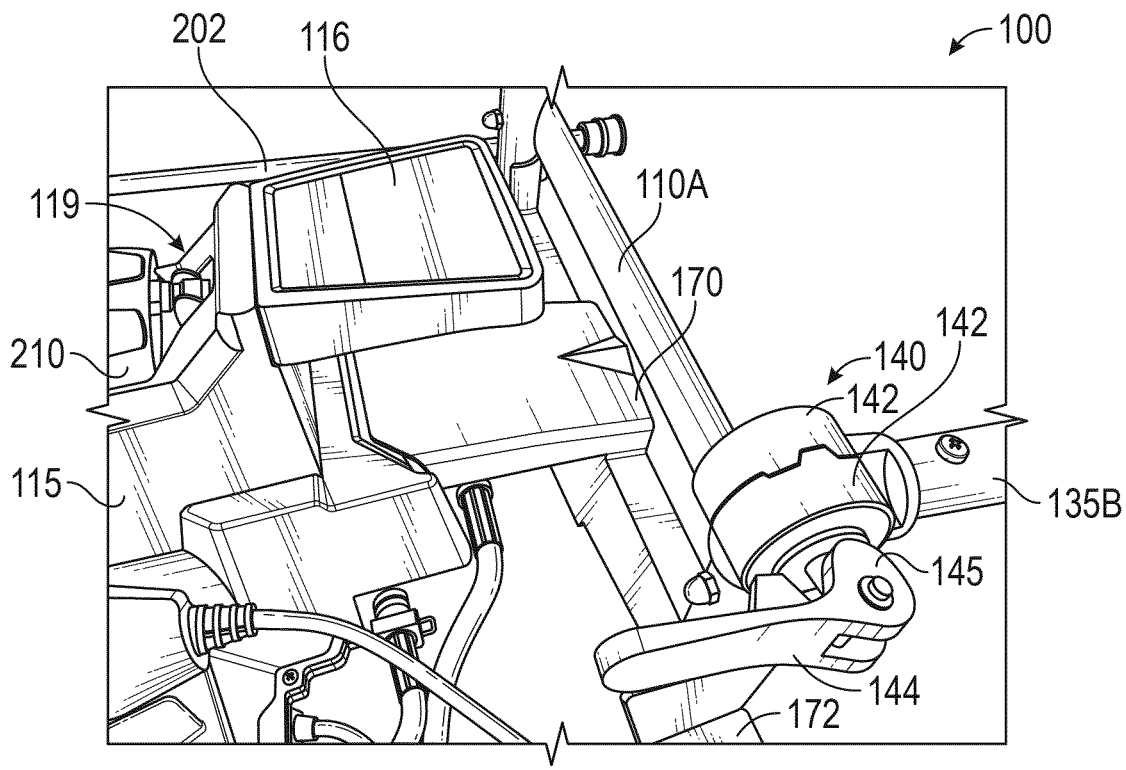
FIG. 16 is a perspective view of a support of the pressure washer of FIG. 1.

Referring to FIGS. 1, 5, and 16, one or more supports 170 are added to the frame 110 in order to support one or more of the housing 115, the gun 201, the wand 202, the wheels 130, the handle 135, the electrical cord 121, the high-pressure hose 155, and the nozzle 210. The support 170 couples to the front end of the housing 115, the front vertical member 110B, and the front vertical member 110C. The high-pressure hose 155 and the electrical cord 121 rest against the support 170 (e.g., directly, indirectly through one another, etc.) while in their respective coiled positions. Additionally, the support 170 includes a gun support 172 and a wand clip 174, shown in FIG. 1 and FIG. 9 respectively, to facilitate storage of the spray gun assembly 200. The spray gun assembly 200 can be disassembled, and the gun 201 and the wand 202 can be releasably coupled to the frame 110 through the gun support 172 and the wand clip 174, respectively.

The gun support 172 includes a shelf with raised sides. The shelf is located and angled such that it supports the grip 204 of the gun 201 while the end of the gun 201 opposite the grip 204 is received within the aperture 132 of the fender 131 on the corresponding lateral side of the pressure washer 100. The raised sides of the shelf prevent the gun 201 from translating side to side. In some embodiments, the gun support 172 includes a strap configured to wrap around the grip 204, holding the gun 201 in place. In other embodiments, the grip 204 is held in place by an interference fit between the grip 204 and the raised sides of the gun support 172 shelf. The wand clip 174 includes a hollow cylindrical extension, the axis of which extends in a front-back direction relative to the pressure washer 100. A slot is cut across the surface of the cylindrical extension running parallel to its axis. This slot is sized such that the shaft of the wand 202 can be pressed through this opening, causing the cylindrical member to expand while the wand 202 passes through the slot and subsequently contract around the shaft of the wand 202, snapping it into place. The shape of the extension holds the wand 202 from falling away from the pressure washer 100 unless intentionally pulled, and the wand 202 is held from translating forwards or backwards by the friction between the cylindrical extension of the wand clip 174 and the shaft of the wand 202. The end of the wand 202 opposite the wand clip 174 is received within the aperture 132 of the fender 131 on the corresponding lateral side of the pressure washer 100.

Referring to FIG. 4, in some embodiments, the pressure washer 100 includes the flow multiplier 300. The flow multiplier 300 functions to provide the pressure washer 100 with at least two operating modes: a high-pressure mode and a high-flow mode. "Flow" means a volumetric flow rate and is frequently measured in gallons per minute ("gpm"). The flow multiplier 300 includes a primary fluid inlet 305 fluidly coupled to the pump outlet 127 and a secondary fluid inlet 310 fluidly coupled to the low-pressure fluid supply that enters through the garden-hose style fitting 128 shown in FIG. 9. In embodiments where the flow multiplier 300 is implemented, the high-pressure fitting 127A for connecting the high-pressure hose 155 is fluidly coupled to a fluid outlet 315 of the flow multiplier 300 instead of directly to the pump outlet 127.

In a configuration where a relatively high back pressure is sent back through the high-pressure hose 155 to the flow multiplier 300 (e.g., a nozzle 210 is used that produces a small diameter jet with a high amount of force), the flow multiplier 300 provides a relatively low-flow, high-pressure supply of water to the nozzle 210, much like a conventional pressure washer. When the flow multiplier 300 experiences a relatively low back pressure, the secondary low pressure fluid from the secondary fluid inlet 310 is drawn into the path of the primary fluid from the primary fluid inlet 305 resulting in a relatively high-flow, low-pressure supply of fluid to the nozzle 210. When used with a nozzle 210 having an appropriate spray pattern, the high-flow, low pressure fluid flow will hold its shape over long distances. This is useful for applications such as cleaning second story windows or knocking a bee's nest from a tree.

In some embodiments, a chemical injection device 320 (e.g., a venturi) adds liquid chemicals (e.g., soap) from the tank 160 into the flowing water prior to the water entering the hose 155. The chemical injection device 320 is fluidly coupled to the tank 160 and the fluid outlet 315. In response to water flow through the pump 125, the chemical injection device 320 injects chemicals into the output water flow when the back pressure at the chemical injection device 320 is below a threshold. The nozzle 210 may be configured to selectively create a desired back pressure lower than the threshold required by the chemical injection device 320. In some embodiments, the chemical injection device 320 is included alongside or incorporated into the flow multiplier 300. In some embodiments, the chemical injection device 320 is omitted, and a manual device for selectively preventing flow (e.g., a ball valve) is included between the tank 160 and the primary flow path to allow the user selectively start and stop the flow of chemicals.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges or geometric relationships provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "upper," "lower," etc.) are merely used to describe the orientation of various elements as illustrated in the Figures. It should be noted that the orientation of various elements may differ according to other exemplary embodiments, and that such variations are intended to be encompassed by the present disclosure.

What is claimed is:

1. A pressure washer, comprising:
   a water pump;
   an electric motor coupled to the water pump and configured to drive the water pump;
   a frame having a first end portion and a second end portion;
   a ground fault circuit interrupter in electrical communication with the electric motor and received within a cradle formed outside a housing at least partially enclosing the electric motor and the water pump;
   a handle having a first end portion and a second end portion; and
   a rotating joint rotatably coupling the first end portion of the handle to the second end portion of the frame, wherein the rotating joint includes a locking mechanism to selectively lock the handle in a position relative to the frame,
   wherein the locking mechanism comprises:
      a pair of joint bodies, each having a hole extending through each of the joint bodies;
      a shaft extending through the hole of each said joint body; and
      a lever including a cam, wherein the lever is rotatably coupled to the shaft;
   wherein the handle is configured to rotate between a storage position and an extended position, wherein in the storage position the second end portion of the handle is positioned above the first end portion of the frame such that the electric motor, the ground fault circuit interrupter, and the water pump are located within a volume defined by the first and second end portions of the handle and the frame, and wherein in the extended position the second end portion of the handle is spaced apart from the frame; and
   wherein when the lever is rotated to a first position, the cam rotates to press against one of the pair of joint bodies to force the joint bodies to interlock and prevent rotation of the handle, and wherein when the lever is rotated to a second position, the cam rotates to allow the pair of joint bodies to separate and allow rotation of the handle.

2. The pressure washer of claim 1, further comprising:
   a hose configured to be coupled to a outlet of the water pump;

an electrical cord configured to supply electricity to the electric motor; and
a hook configured to retain the hose in a coiled position on the hook and to retain the electrical cord in a coiled position on the hook.

3. The pressure washer of claim 2, wherein, with the handle in the storage position and the hose and the electrical cord in the respective coiled positions, the hose and the electrical cord are positioned within the volume defined by the first and second end portions of the handle and the frame.

4. The pressure washer of claim 3, wherein, with the handle in the storage position, the handle secures the hose in the coiled position on the hook and secures the electrical cord in the coiled position on the hook.

5. The pressure washer of claim 3, further comprising:
a first wheel and a second wheel each rotatably coupled to the first end portion of the frame;
a first fender positioned above the first wheel; and
a second fender positioned above the second wheel;
wherein the first fender and the second fender each extend above the corresponding wheel and below the hose in the coiled position and above the corresponding wheel and below the electrical cord in the coiled position.

6. The pressure washer of claim 5, further comprising a spray gun assembly configured to be fluidly coupled to the hose, wherein the first fender and the second fender each define an aperture that receives at least a portion of the spray gun assembly.

7. The pressure washer of claim 1, wherein the housing is attached to the frame.

8. The pressure washer of claim 7, further comprising an electrical cord configured to supply electricity to the electric motor, wherein the electrical cord includes:
the ground fault circuit interrupter unit; and
an electrical connector configured to connect to a power outlet;
wherein the ground fault circuit interrupter unit is configured to selectively electrically disconnect the electric motor from the electrical connector upon detection of a ground fault.

9. The pressure washer of claim 1, wherein the frame defines at least a portion of
a body supporting the water pump and the electric motor, wherein the body has a first side and a second side;
wherein in a normal operating orientation, the first side is configured to be disposed nearer to a surface for supporting the pressure washer than the second side such that the pressure washer defines a first footprint having a first area;
wherein in a storage orientation, the second side is configured to be disposed nearer to the surface for supporting the pressure washer than the first side such that the pressure washer defines a second footprint having a second area less than the first area; and
wherein the pressure washer is configured to stand stably on a flat and level surface in both the normal operating orientation and the storage orientation.

10. The pressure washer of claim 9, wherein the first side has a length and the second side has a depth, wherein the length of the first side is greater than the depth of the second side, and wherein the first footprint and the second footprint have equal widths.

11. The pressure washer of claim 10, wherein the electric motor comprises an output shaft configured to rotate about an axis of rotation;
wherein the output shaft is coupled to the water pump;
wherein the length of the first side is measured substantially parallel to the axis of rotation; and
wherein the depth of the second side is measured substantially perpendicular to the axis of rotation.

12. The pressure washer of claim 11, wherein the axis of rotation of the output shaft is a first axis of rotation, further comprising a pair of wheels rotatably coupled to the body and both configured to rotate about a second axis of rotation, wherein the second axis of rotation of the wheels is substantially perpendicular to the first axis of rotation.

13. The pressure washer of claim 12, further comprising a fitting disposed fluidly downstream of the water pump and fixed relative to the body, wherein a first distance between the fitting and the second axis of rotation of the wheels is greater than a second distance between the electric motor and the second axis of rotation of the wheels.

14. The pressure washer of claim 1, wherein the frame defines at least a portion of
a body supporting the water pump and the electric motor, wherein the body has a first side and a second side;
a chemical injector positioned to selectively add chemicals to an output water flow; and
a chemical storage tank, comprising:
a tank body defining a storage volume for storing chemicals, wherein the storage volume is fluidly coupled to the chemical injector; and
a fill neck extending from the tank body, wherein the fill neck defines an inlet opening, an outlet opening, and a fill passage extending between the inlet opening and the outlet opening, and wherein the outlet opening fluidly couples the fill passage to the storage volume;
wherein in a normal operating orientation, the first side is configured to be disposed nearer to a surface for supporting the pressure washer than the second side, and the outlet opening is positioned below the inlet opening; and
wherein in a storage orientation, the second side is configured to be disposed nearer to the surface for supporting the pressure washer than the first side, and the outlet opening is positioned below the inlet opening.

15. The pressure washer of claim 14, wherein the inlet opening is a first inlet opening and the outlet opening is a first outlet opening, further comprising a chemical outlet extending from the tank body, wherein the chemical outlet defines a second inlet opening, a second outlet opening, and a drain passage extending between the second inlet opening and the second outlet opening, and wherein the second inlet opening fluidly couples the drain passage to the storage volume;
wherein in the normal operating orientation, the second outlet opening is positioned below the second inlet opening; and
wherein in the storage orientation, the second outlet opening is positioned below the second inlet opening.

16. The pressure washer of claim 14, wherein the tank body of the chemical storage tank has a center plane and wherein a central axis of the fill neck is angled relative to the center plane of the tank body in order to facilitate user access to the fill neck from adjacent to the pressure washer.

17. The pressure washer of claim 1, wherein each joint body further includes a plurality of grooves and ridges;
wherein in the first position, the plurality of grooves and ridges of each joint body interlock with the corresponding plurality of groove and ridges of the other joint body to prevent the pair of joint bodies from rotating relative to each other.

18. The pressure washer of claim 17, wherein when the handle is in the storage position, the lever is in the first position.

19. A pressure washer, comprising:
   a water pump;
   an electric motor coupled to the water pump and configured to drive the water pump, wherein the electric motor comprises an output shaft configured to rotate about an axis of rotation;
   a frame having a first end portion and a second end portion;
   a handle having a first end portion and a second end portion; and
   a rotating joint rotatably coupling the first end portion of the handle to the second end portion of the frame, wherein the rotating joint includes a locking mechanism to selectively lock the handle in a position relative to the frame,
   wherein the locking mechanism comprises:
      a pair of joint bodies, each having a hole extending through each of the joint bodies;
      a shaft extending through the hole of each said joint body; and
      a lever including a cam, wherein the lever is rotatably coupled to the shaft;
   wherein the handle is configured to rotate between a storage position and an extended position, wherein in the storage position the second end portion of the handle is positioned above the first end portion of the frame such that the electric motor and the water pump are located within a volume defined by the first and second end portions of the handle and the frame, and wherein in the extended position the second end portion of the handle is spaced apart from the frame;
   wherein when the lever is rotated to a first position, the cam rotates to press against one of the pair of joint bodies to force the joint bodies to interlock and prevent rotation of the handle, and wherein when the lever is rotated to a second position, the cam rotates to allow the pair of joint bodies to separate and allow rotation of the handle
   wherein the frame defines at least a portion of a body supporting the water pump and the electric motor, wherein the body has a first side and a second side;
   wherein in a normal operating orientation, the first side is configured to be disposed nearer to a surface for supporting the pressure washer than the second side, such that the pressure washer defines a first footprint having a first area;
   wherein in a storage orientation, the second side is configured to be disposed nearer to the surface for supporting the pressure washer than the first side, such that the pressure washer defines a second footprint having a second area less than the first area;
   wherein the pressure washer is configured to stand stably on a flat and level surface in both the normal operating orientation and the storage orientation;
   wherein the first side has a length and the second side has a depth, wherein the length of the first side is greater than the depth of the second side, and wherein the first footprint and the second footprint have equal widths;
   wherein the output shaft is coupled to the water pump;
   wherein the length of the first side is measured substantially parallel to the axis of rotation;
   wherein the depth of the second side is measured substantially perpendicular to the axis of rotation;
   wherein the axis of rotation of the output shaft is a first axis of rotation, further comprising a pair of wheels rotatably coupled to the body and both configured to rotate about a second axis of rotation, wherein the second axis of rotation of the wheels is substantially perpendicular to the first axis of rotation; and
   wherein a fitting disposed fluidly downstream of the water pump and fixed relative to the body, wherein a first distance between the fitting and the second axis of rotation of the wheels is greater than a second distance between the electric motor and the second axis of rotation of the wheels.

20. A pressure washer, comprising:
   a water pump;
   an electric motor coupled to the water pump and configured to drive the water pump;
   a frame having a first end portion and a second end portion;
   a handle having a first end portion and a second end portion;
   a chemical injector positioned to selectively add chemicals to an output water flow; and
   a chemical storage tank, comprising:
      a tank body defining a storage volume for storing chemicals, wherein the storage volume is fluidly coupled to the chemical injector; and
      a fill neck extending from the tank body, wherein the fill neck defines an inlet opening, an outlet opening, and a fill passage extending between the inlet opening and the outlet opening, and wherein the outlet opening fluidly couples the fill passage to the storage volume; and
   a rotating joint rotatably coupling the first end portion of the handle to the second end portion of the frame, wherein the rotating joint includes a locking mechanism to selectively lock the handle in a position relative to the frame,
   wherein the locking mechanism comprises:
      a pair of joint bodies, each having a hole extending through each of the joint bodies;
      a shaft extending through the hole of each said joint body; and
      a lever including a cam, wherein the lever is rotatably coupled to the shaft;
   wherein the handle is configured to rotate between a storage position and an extended position, wherein in the storage position the second end portion of the handle is positioned above the first end portion of the frame such that the electric motor and the water pump are located within a volume defined by the first and second end portions of the handle and the frame, and wherein in the extended position the second end portion of the handle is spaced apart from the frame; and
   wherein when the lever is rotated to a first position, the cam rotates to press against one of the pair of joint bodies to force the joint bodies to interlock and prevent rotation of the handle, and wherein when the lever is rotated to a second position, the cam rotates to allow the pair of joint bodies to separate and allow rotation of the handle;
   wherein the frame defines at least a portion of a body supporting the water pump and the electric motor, wherein the body has a first side and a second side;
   wherein in a normal operating orientation, the first side is configured to be disposed nearer to a surface for supporting the pressure washer than the second side, and the outlet opening is positioned below the inlet opening; and wherein in a storage orientation, the second side is configured to be disposed nearer to the surface for supporting the pressure washer than the first side, and the outlet opening is positioned below the inlet opening.

\* \* \* \* \*